United States Patent
Ishikawa

(10) Patent No.: US 7,860,387 B2
(45) Date of Patent: Dec. 28, 2010

(54) IMAGING APPARATUS AND CONTROL METHOD THEREFOR

(75) Inventor: Yoshikazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/538,002

(22) Filed: Aug. 7, 2009

(65) Prior Publication Data

US 2010/0040356 A1 Feb. 18, 2010

(30) Foreign Application Priority Data

Aug. 12, 2008 (JP) .............................. 2008-208082
Sep. 1, 2008 (JP) .............................. 2008-223917

(51) Int. Cl.
G03B 3/00 (2006.01)
(52) U.S. Cl. ..................................................... 396/124
(58) Field of Classification Search ................... 396/89, 396/124

See application file for complete search history.

(56) References Cited

U.S. PATENT DOCUMENTS

| 2004/0125229 | A1 | 7/2004 | Aoyama et al. |
| 2006/0204235 | A1* | 9/2006 | Sasaki ........................ 396/124 |
| 2009/0073285 | A1* | 3/2009 | Terashima ............. 348/231.99 |
| 2009/0322933 | A1* | 12/2009 | Ishii ........................... 348/345 |

FOREIGN PATENT DOCUMENTS

| JP | 2001-215403 A | 8/2001 |
| JP | 2004-212556 A | 7/2004 |

* cited by examiner

*Primary Examiner*—W. B. Perkey
*Assistant Examiner*—Dennis Hancock
(74) *Attorney, Agent, or Firm*—Canon USA Inc IP Division

(57) ABSTRACT

By using a result of a detection of an object such as a face, stable focus adjustment of the object can be performed with accuracy. Even if an area that includes the object is not detected, if a tilt of an imaging apparatus is not changed, or a panning or a tilting operation is not detected, a focus detection area, which is used when the object is detected, is maintained.

13 Claims, 21 Drawing Sheets

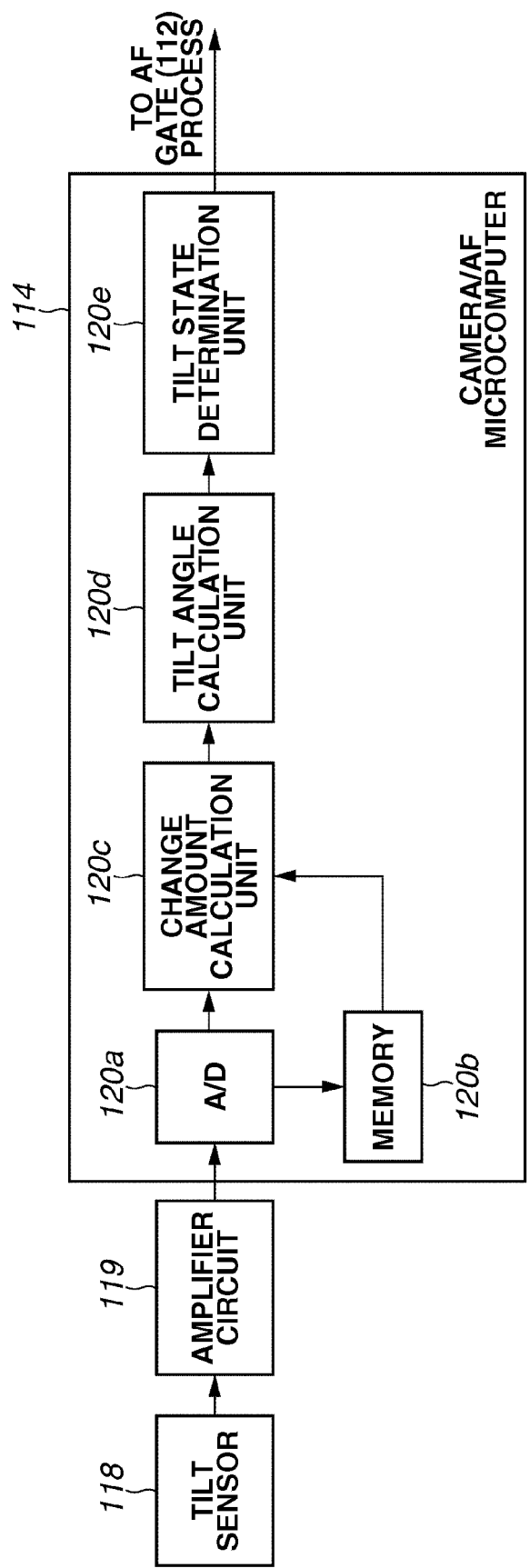

NORMAL POSITION

TILT OF SENSOR

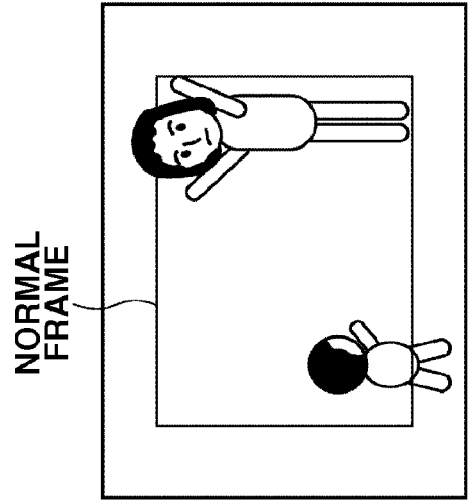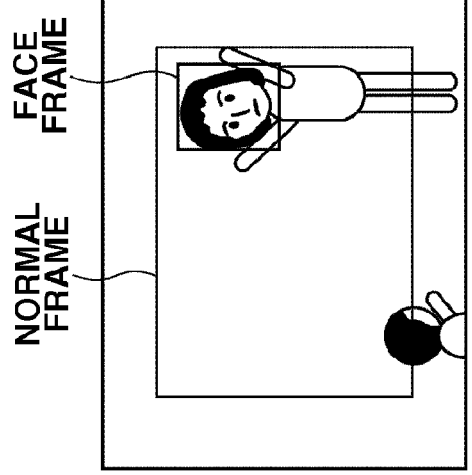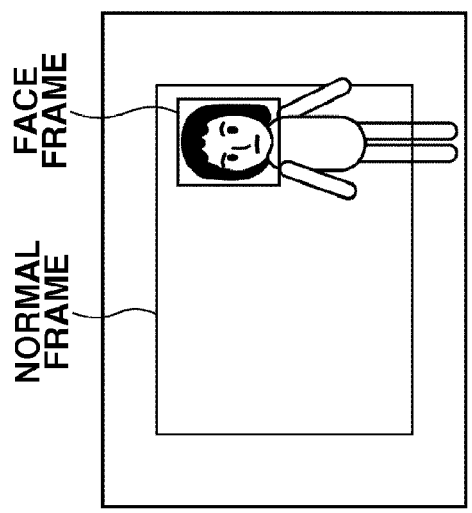

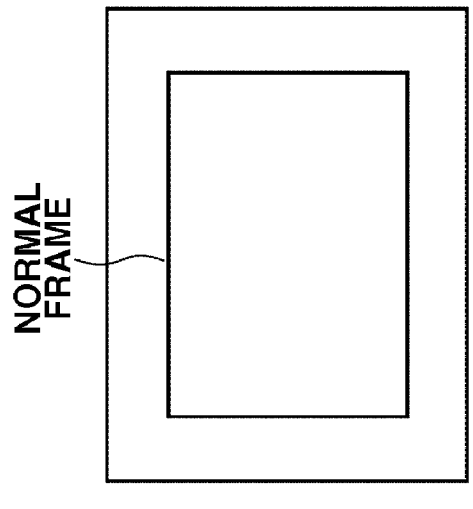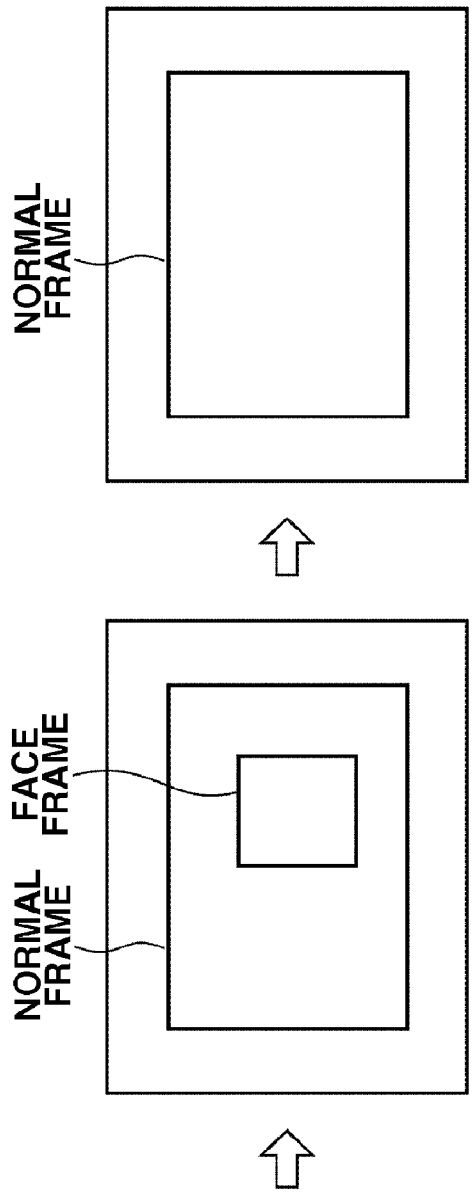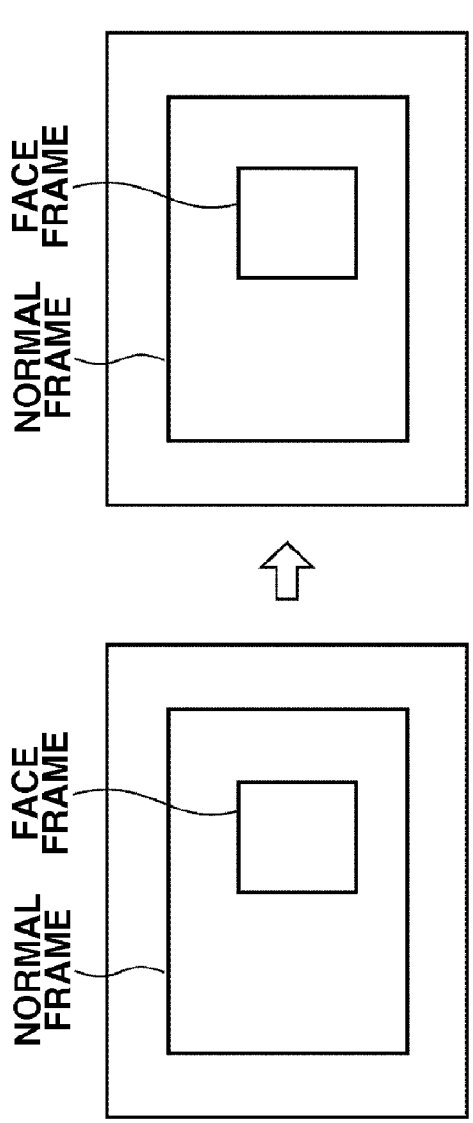

IMAGING APPARATUS AND CONTROL METHOD THEREFOR

BACKGROUND OF THE INVENTION

1. Field of the Invention

The present invention relates to an imaging apparatus and, more particularly, to a focus adjustment method used for the imaging apparatus.

2. Description of the Related Art

Contrast auto-focus (AF) control is a major AF control method used in video cameras or the like. According to the contrast AF control, an AF evaluation value, which represents an in-focus state (contrast state) of an image signal, is generated. The AF evaluation value is generated using an image sensor while a focus lens is moving. Then, a position of the focus lens where the AF evaluation value is largest is searched.

However, in capturing an image of a human figure, due to contrast between a human figure as a main object and its background, in some cases, background objects are focused rather than the human figure.

In order to solve this issue, an imaging apparatus having a face detection function has been developed. Japanese Patent Application Laid-Open No. 2006-227080 discusses an imaging apparatus that sets a focus detection area corresponding to a recognized face area and performs focus detection.

Further, Japanese Patent Application Laid-Open No. 2001-215403 discusses an imaging apparatus that detects an eye of a human figure, sets a focus detection area corresponding to the area of the eye, and performs focus detection.

Further, Japanese Patent Application Laid-Open No. 2004-212556 discusses an imaging apparatus, which expands the focus detection area when determining focus if a movement of an object is detected during imaging or if a camera movement such as panning or tilting (hereinafter simply referred to as "panning") is detected.

However, in using a camera with live view function that can capture a moving image, different from the case of capturing a still image, the object tends to keep moving. Thus, it is difficult to recognize a face with stability and thus the AF control becomes unstable.

If a face is recognized, then, by specifying a face area as the area to be focused, the in-focus state of the human figure can be stabilized. However, if the person turns his face away or closes his eyes, or if camera shake occurs, then the face recognition becomes difficult.

Under such an imaging condition where the recognition of the face varies depending on the condition of the object, if an area used for detecting focus is changed depending on whether the face is recognized or not, the AF evaluation value will be affected, and stable focus adjustment cannot be achieved.

Further, various objects come in and out of the screen area when a moving image is captured. A user generally captures a moving image by arranging the object position at the center of the screen. However, if a face of another person is recognized, and if the face is focused, then the object will not be in-focus as intended by the user.

Furthermore, sometimes it is difficult to detect a face depending on a movement of the object, a change in camera angle, or a camera work such as panning. In such a case, even if the focus area is expanded in determining focus when a camera movement is detected as discussed in Japanese Patent Application Laid-Open No. 2004-212556, it is difficult to follow the movement of the main object. Thus, the AF evaluation value of the moving image obtained from such a focus detection area becomes unstable.

SUMMARY OF THE INVENTION

The present invention is directed to an imaging apparatus that allows focus adjustment of an object, such as a face, using a detection result of the object with stability and with accuracy.

According to an aspect of the present invention, an imaging apparatus includes a detection unit configured to detect an object image to be focused from an image signal obtained by imaging, a setting unit configured to set a focus detection area used for acquiring an AF evaluation value that indicates a focus state of an imaging optical system, a focus adjustment unit configured to perform focus adjustment by acquiring the AF evaluation value based on the image signal obtained from the focus detection area, and by moving the imaging optical system based on the AF evaluation value, and a determination unit configured to determine whether a tilt of the imaging apparatus is changed, wherein the setting unit maintains setting of the focus detection area if the object image to be focused is detected by the detection unit, and the object image becomes unable to be detected after the focus detection area is set based on the detection result, and the tilt is determined to be unchanged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a block diagram illustrating a tilt sensor, an amplifier circuit, and other units used for determining a tilt of the video camera based on an amplified output signal of the tilt sensor according to the first exemplary embodiment of the present invention.

FIGS. 10A to 10C illustrate a shift between a face frame and a normal frame, which are set as AF frames, based on a tilting detection result caused by framing according to the first exemplary embodiment of the present invention.

FIGS. 17A to 17C illustrate a shift between a face frame and a normal frame, which are set as AF frames, based on a result of the panning detection according to the third exemplary embodiment of the present invention.

DETAILED DESCRIPTION OF THE EMBODIMENTS

Various exemplary embodiments, features, and aspects of the invention will be described in detail below with reference to the drawings.

Figure 1:
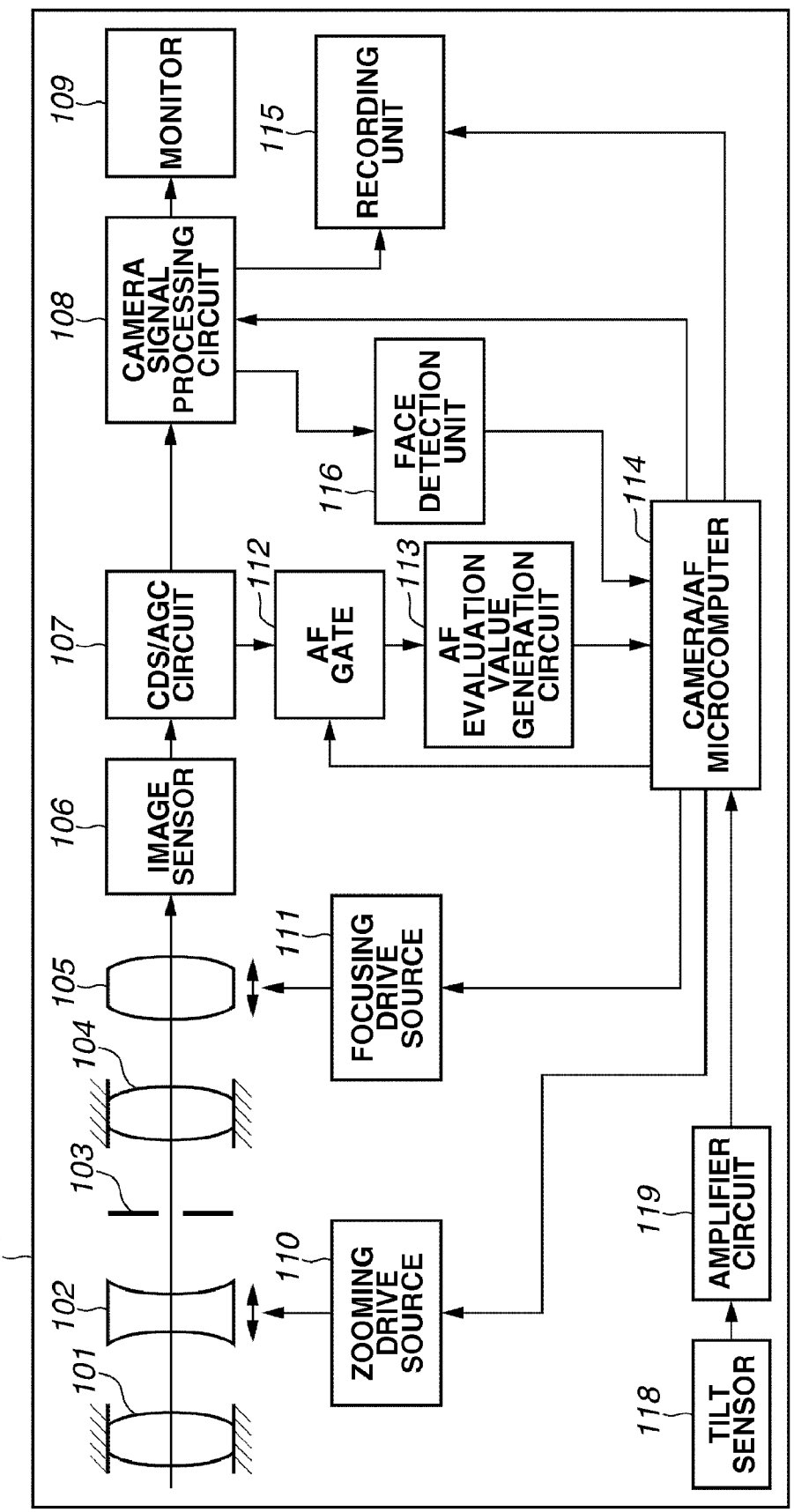
FIG. 1 is a block diagram illustrating a configuration of a video camera according to a first exemplary embodiment of the present invention.

FIG. 1 is a block diagram illustrating a configuration of a video camera as an example of an imaging apparatus according to a first exemplary embodiment of the present invention. According to the present exemplary embodiment, a video camera is taken as an example, however, a different imaging apparatus that can capture moving images (including live view) such as a digital still camera can also be used in place of the video camera.

In FIG. 1, a video camera main body (hereinafter referred to as a "video camera") 100 includes a first stationary lens 101, a variable power lens 102 that moves along an optical axis for zooming, and a diaphragm 103.

The video camera 100 further includes a second stationary lens 104 and a focus compensator lens (hereinafter referred to as a focus lens) 105. The focus compensator lens 105 serves as a focus adjusting member having functions for correcting movement of a focal plane associated with magnification and focusing. The first stationary lens 101, the variable power lens 102, the diaphragm 103, the second stationary lens 104, and the focus lens 105 constitute an imaging optical system.

An image sensor 106 is constituted by a charge-coupled device (CCD) sensor or a complementary metal-oxide semiconductor (CMOS) sensor. A CDS/AGC circuit 107 performs sampling of an output from the image sensor 106 and adjusts a gain. A camera signal processing circuit 108 performs various types of image processing for a signal output from the CDS/AGC circuit 107 and generates an image signal.

A monitor 109 includes, for example, a liquid crystal display (LCD). The monitor 109 displays the image signal generated by the camera signal processing circuit 108. A recording unit 115 records the image signal generated by the camera signal processing circuit 108 on a recording medium such as a magnetic tape, an optical disk, a hard disk, or a semiconductor memory.

A zooming drive source 110 moves the variable power lens 102. A focusing drive source 111 moves the focus lens 105. Each of the zooming drive source 110 and the focusing drive source 111 includes an actuator such as a stepping motor, a DC motor, a vibration motor, or a voice coil motor.

An AF gate 112 passes only signals in an area (focus detection area) used for the focus detection out of signals of all pixels output from the CDS/AGC circuit 107. An AF evaluation value generation circuit 113 extracts a high frequency component and a luminance difference component (difference between the highest and the lowest values of a luminance level of a signal that passed the AF gate 112) from the signal that passed the AF gate 112 and generates an AF evaluation value.

The generated AF evaluation value is output to a camera/AF microcomputer 114. The AF evaluation value indicates sharpness (contrast) of an image signal that is generated based on a signal output from the image sensor 106. Since the sharpness varies depending on an in-focus state of the imaging optical system, it actually indicates the in-focus state of the imaging optical system.

In addition to controlling the whole video camera 100, the camera/AF microcomputer 114 controls focus by controlling the focusing drive source 111, based on the AF evaluation value, and moving the focus lens 105. The focus control method used by the camera/AF microcomputer 114 is contrast AF.

A face detection unit 116 detects a face area of a human figure in an imaging screen by processing the image signal with a publicly known face recognition method, and sends the result to the camera/AF microcomputer 114. The camera/AF microcomputer 114 sets a focus detection area (face frame) in an area in the imaging screen including the face area based on a detection result of the face area that is sent as described below, and sends the information to the AF gate 112.

According to a known face recognition process, a skin color area is extracted from a gradation color of each pixel expressed in image data, and a face is detected according to matching rate between the extracted skin color area and an outline plate of a face that is prepared in advance. Further, there are methods by which a face is detected by extracting feature points of a face including eye, nose, and mouth using a known pattern recognition method. The present invention, however, is not limited to the face recognition method.

A tilt sensor 118 detects a tilt of the video camera 100 at the time of imaging. Although an acceleration sensor is generally used, a different type of tilt sensor can be used so long as it can detect a tilt of the apparatus.

A tilt signal that is output from the tilt sensor 118 is amplified by a predetermined amount at an amplifier circuit 119, sent to the camera/AF microcomputer 114, and used for determining a tilt state of the video camera 100.

Next, focus adjustment control (AF control) of the camera/AF microcomputer 114 will be described referring to FIGS. 2 to 6. The AF control is executed by the camera/AF microcomputer 114 executing a computer program stored in the camera/AF microcomputer 114.

First, the AF control executed by the camera/AF microcomputer 114 will be described referring to the flowchart illustrated in FIG. 2.

In step S201, the AF control process is started. In step S202, the camera/AF microcomputer 114 performs the face detection processing on the object image obtained by the face detection unit 116. The face detection processing in step S202 is performed using a known method.

In step S203, the camera/AF microcomputer 114 determines whether a face is detected. If a face is detected (YES in step S203), the process proceeds to step S204. If a face is not detected (NO in step S203), then the process proceeds to step S301.

In step S204, the camera/AF microcomputer 114 sets a face frame used for defining the focus detection area as an AF frame as well as a normal frame used for defining a normal focus detection area, and the process proceeds to step S205.

Figure 3:
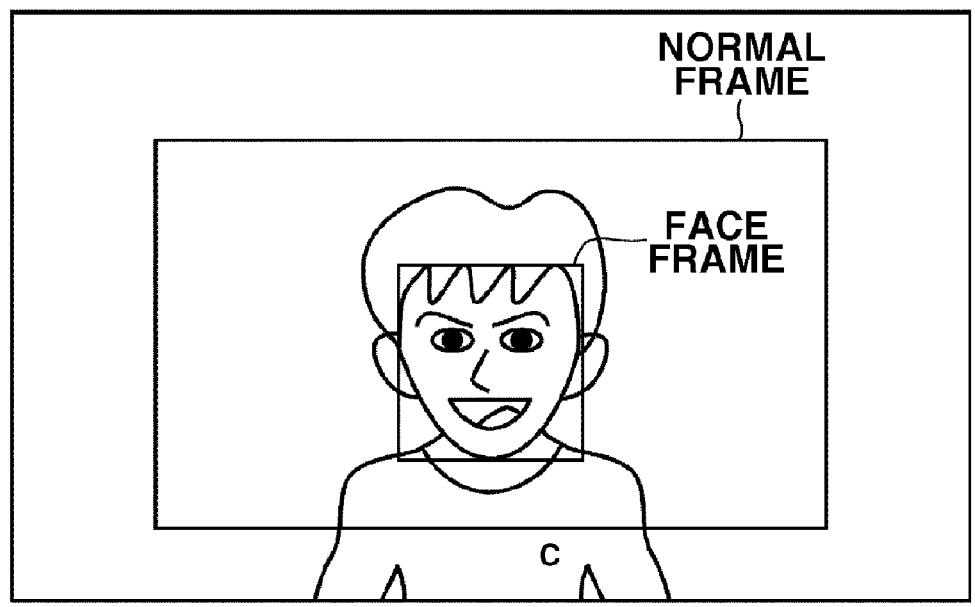
FIG. 3 illustrates a setting example of a face frame and a normal frame that are set as AF frames according to an exemplary embodiment of the present invention.

An example of an AF frame set in step S204 is illustrated in FIG. 3. In step S205, the camera/AF microcomputer 114 acquires an AF evaluation value of image signal each obtained from pixels in the face frame and the normal frame that are set in step S204, and the process proceeds to step S206.

In step S206, the camera/AF microcomputer 114 acquires position information of the face detection area on a screen based on a distance from predetermined coordinates, and the process proceeds to step S207.

Although central coordinates of the screen may be used as the predetermined coordinates. However, considering imaging of a human figure, since the human face is usually positioned at the upper portion of the screen, although it depends on the angle of view, it is useful to set the face on the upper portion of the screen.

In step S207, based on the position information of the face frame acquired in step S206, the camera/AF microcomputer 114 recalculates the AF evaluation value of the face frame using weighted calculation by multiplying a predetermined ratio that is changed according to a position of the face on the screen.

Figure 4:
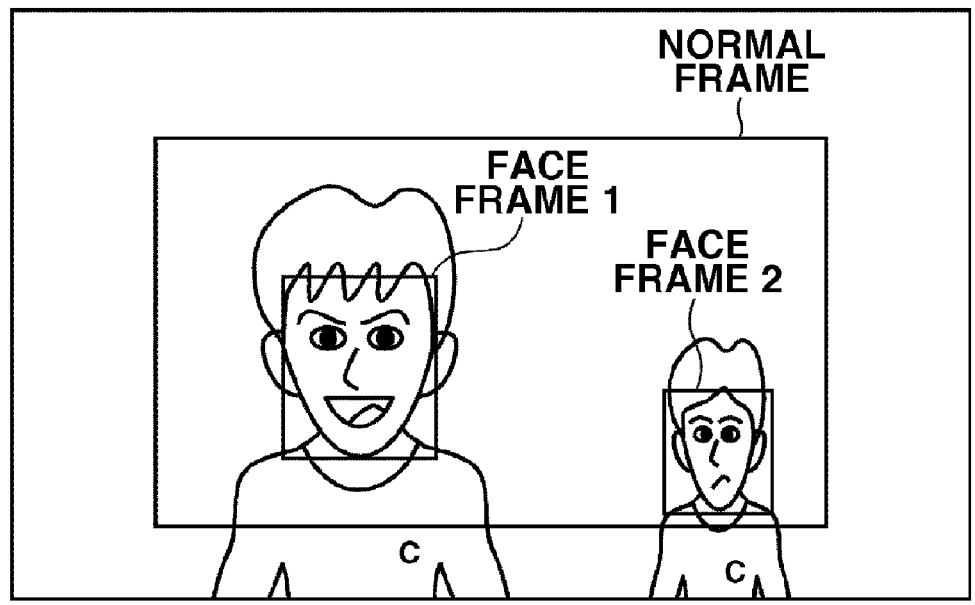
FIG. 4 illustrates another setting example of a face frame and a normal frame that are set as AF frames according to the exemplary embodiment of the present invention.

For example, if a person comes in the imaging angle from outside of the screen during imaging, the ratio of weighting used for the AF control is changed according to the position of the face frame, whether it is at the corner of the screen or in the vicinity of the center of the screen. FIG. 4 illustrates an example of a case where a plurality of face frames are arranged in different positions. When the recalculation of the AF evaluation value of the face frame is completed, then the process proceeds to step S208.

In step S208, the camera/AF microcomputer 114 adds the AF evaluation value of the face frame that is recalculated (weighted calculation) in step S207 and the AF evaluation value of the normal frame so as to obtain a final AF evaluation value. Then, the process proceeds to step S209.

In step S209, the camera/AF microcomputer 114 performs contrast AF type focus adjustment. Then, the process returns to step S202 and the processes of the above-described AF control are repeated. The contrast AF control process will be described below referring to FIG. 5.

Next, a case where the face is not detected in step S203 will be described.

In step S301, the camera/AF microcomputer 114 detects a change in tilt based on a tilt signal of the video camera 100 detected by the tilt sensor 118. In other words, the camera/AF microcomputer 114 detects a change in tilt of the video camera 100 that occurred due to the user's camera-work. Details of the tilt change detection processing will be described below.

In step S302, the camera/AF microcomputer 114 determines whether the change in tilt of the video camera 100 is detected by the tilt change detection processing in step S301. If the change in tilt is not detected (No in step S302), then the process proceeds to step S204 and a process that is performed when the face is detected in step S203 will be performed.

Although the process proceeds to step S301 only when the face is not detected, the camera/AF microcomputer 114 holds the face frame as an AF frame, which is set at the time the face is detected, until the detection of the change in the tilt of the video camera 100 is determined. In this way, the change in the AF evaluation value can be reduced and a stable in-focus state can be obtained.

On the other hand, if the change in tilt is determined (YES in step S302), then the process proceeds to step S210. In step S210, the camera/AF microcomputer 114 sets only the normal frame as the AF frame. When the normal frame is set, a small frame is simultaneously set at the center of the normal frame.

In step S211, since the normal frame is set in step S210, the camera/AF microcomputer 114 acquires an AF evaluation value of the normal frame, and the process proceeds to step S208 and then step S209, so that the contrast AF control is performed.

Next, the contrast AF control performed by the camera/AF microcomputer 114 in step S209 will be described referring to FIG. 5.

In step S501, the camera/AF microcomputer 114 starts the contrast AF control processing. Instep S502, the camera/AF microcomputer 114 executes a minute-drive of the focus lens 105. Herein, minute-drive of focus lens refers to an operation in which a plurality AF evaluation values are obtained while focus lens is moved. More specifically, several AF evaluation values are obtained each time the focus lens is moved by several steps.

In step S503, the camera/AF microcomputer 114 determines whether the object is in focus by the minute-driving.

If the object is not in focus (NO in step S503), then the process proceeds to step S504. In step S504, the camera/AF microcomputer 114 determines whether an in-focus direction is determined according to the above-described minute-driving. If the in-focus direction is not determined (NO in step S504), then the process returns to step S502. If the in-focus direction is determined (YES in step S504), then the process proceeds to step S505. In step S505, the camera/AF microcomputer 114 moves the focus lens 105 at a high speed in a direction that allows increased AF evaluation value by a hill-climbing drive. Herein, the hill-climbing drive of focus lens refers to an operation in which a plurality of AF evaluation values are repeatedly obtained while the focus lens is being moved. Then, the focus lens is moved in a direction where the AF evaluation value increases.

In step S506, the camera/AF microcomputer 114 determines whether the focus lens 105 has moved beyond the position where the peak AF evaluation value is obtained (hereinafter referred to as peak-value position) as a result of the hill-climbing drive. If the focus lens 105 has not moved beyond the peak-value position (NO in step S506), then the process returns to step S505 and the hill-climbing drive will be continued. If the focus lens 105 has moved beyond the peak-value position (YES in step S506), then the process proceeds to step S507. In step S507, the camera/AF microcomputer 114 drives the focus lens 105 in the opposite direction so that the lens returns to the peak-value position.

In step S508, the camera/AF microcomputer 114 determines whether the AF evaluation value is returned to the peak value. If the AF evaluation value is not returned to the peak value (NO in step S508), then the process returns to step S507, and the operation to return the lens to the peak-value position will be continued. If the AF evaluation value is returned to the peak value (YES in step S508), then the process returns to step S502 and the camera/AF microcomputer 114 searches the in-focus position of the next moving image by micro-driving the focus lens 105.

In step S503, if in-focus state is obtained (YES in step S503), then the process proceeds to step S509. In step S509, the camera/AF microcomputer 114 stops the minute-driving of the focus lens 105. Then, restart determination of the contrast AF control processing is started. In step S510, the camera/AF microcomputer 114 holds the AF evaluation value of the in-focus state. In step S511, the camera/AF microcomputer 114 obtains the AF evaluation value of this time. In step S512, the camera/AF microcomputer 114 compares the AF evaluation value of this time obtained in step S511 with the AF evaluation value of the last time held in step S510 and determines whether the AF evaluation value has changed more than a predetermined value.

If the AF evaluation value has changed more than a predetermined value (YES in step S512), then the camera/AF microcomputer 114 determines that the contrast AF control needs to be restarted, and the process returns to step S502. If the AF evaluation value has not changed more than a predetermined value (NO in step S512), then the process proceeds to step S513. In step S513, the camera/AF microcomputer 114 stops the focus lens 105. Then the process returns to step S511 and the camera/AF microcomputer 114 continues the restart determination processing.

Figure 6:
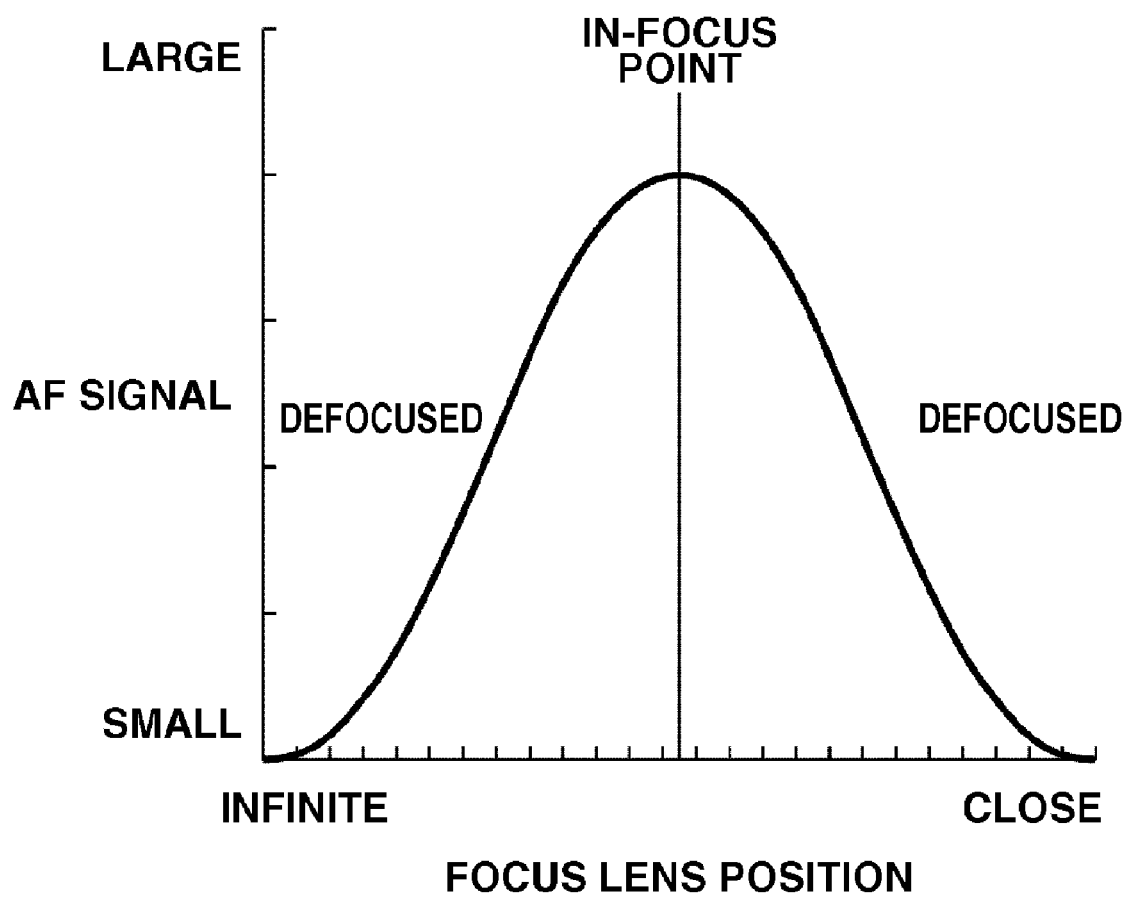
FIG. 6 is a graph illustrating a principle of auto-focus of contrast AF method.

In this way, in the contrast AF processing, processes of the restart determination, the minute-drive, and the hill-climbing drive are repeated to control drive of the focus lens 105 and thus the AF evaluation value is always at its peak value. FIG. 6 is a graph illustrating that the point having the highest AF evaluation value is the in-focus position.

Figure 8A:
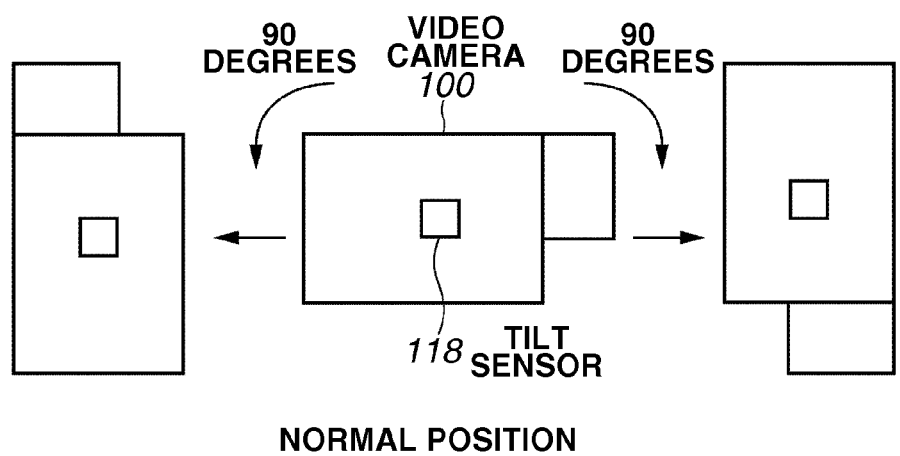
FIGS. 8A and 8B illustrate a relationship between a tilt of a video camera and a tilt signal detected by the tilt sensor according to the first exemplary embodiment of the present invention.

Next, detection of the tilt change of the video camera 100 based on the tilt signal detected by the tilt sensor 118 will be described referring to FIGS. 7 to 9.

FIG. 7 is a block diagram illustrating the tilt sensor 118 that detects the tilt of the video camera 100, the amplifier circuit 119, and the components used for determining the tilt of the camera. In FIG. 7, the tilt sensor 118 includes an acceleration sensor according to the first exemplary embodiment. The amplifier circuit 119 amplifies the tilt signal output from the tilt sensor 118 for a predetermined amount.

The tilt signal amplified by the amplifier circuit 119 is input in the camera/AF microcomputer 114. In the camera/AF microcomputer 114, the tilt signal, which is an analog signal, is converted into a digital signal by an A/D converter 120a. Then the tilt signal is stored in a memory 120b and is also supplied to a change amount calculation unit 120c.

The change amount calculation unit 120c calculates an amount of change of a voltage based on the difference between the digital value of the present tilt signal and the digital value of the tilt signal previously stored in the memory 120b. Since the output voltage of the tilt sensor 118 depends on the camera-work of the user, the change in the tilt of the video camera 100 can be determined from the change in the output of the tilt sensor 118.

The difference in the output voltage of the tilt sensor 118 calculated by the change amount calculation unit 120c is converted into an angle by a tilt angle calculation unit 120d. The angle is, in other words, an amount of change in the tilt angle of the video camera 100 due to the user's camera-work.

Next, a tilt state determination unit 120e determines whether the amount of change of the angle of the video camera 100 exceeds a threshold value using the amount of change of the tilt angle calculated by the tilt angle calculation unit 120d. The result of this determination is used when the determination processing of the face detection described in step S302 in FIG. 2 is temporarily disabled.

Although the tilt sensor 118, the amplifier circuit 119, the A/D converter 120a, the memory 120b, the change amount calculation unit 120c, the tilt angle calculation unit 120b, and the tilt state determination unit 120e having the above-described configuration are required for each axis used in detecting the tilt, the components for one system are illustrated for the sake of simplicity. Such components are to be regarded as representing the description.

Further, by using a sensor that is capable of triaxial detection, the function of the tilt sensor 118 can be realized by not using a plurality of sensors having a single detection axis. Furthermore, although a tilt of the video camera 100 in the up and down directions is discussed in the first exemplary embodiment, a tilt in the rotational direction with respect to the optical axis as the axis of rotation can be detected in a similar manner.

Next, a relation of the tilt of the video camera 100 and the tilt signal detected by the tilt sensor 118 will be described referring to FIGS. 8A and 8B. In FIG. 8A, the video camera illustrated at the center is the video camera 100 at its normal position at the time of normal imaging. The video camera 100 illustrated on the left is tilted up 90 degrees. The video camera 100 on the right is tilted down 90 degrees.

Figure 8B:
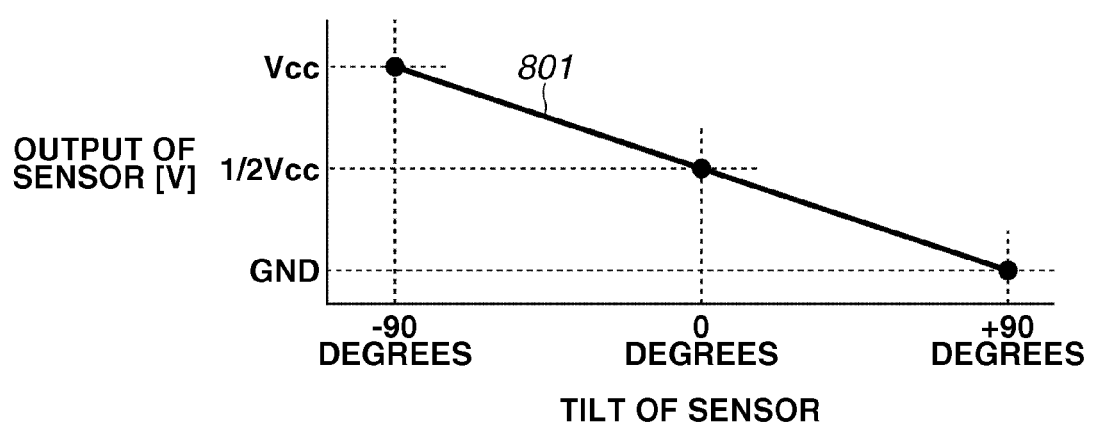
Figure 9:
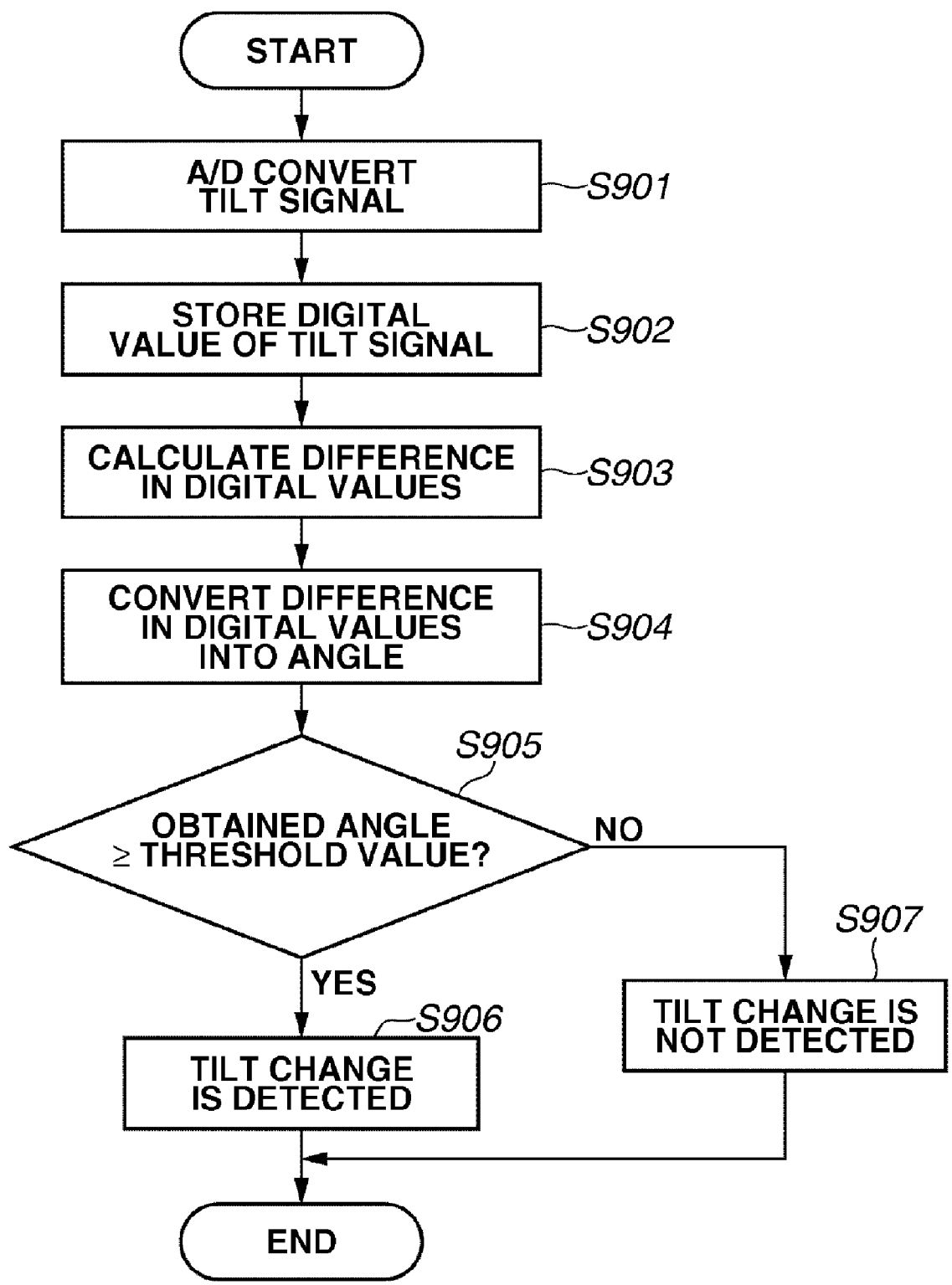
FIG. 9 is a flowchart illustrating calculation of a tilt angle and determination of a tilt state according to the first exemplary embodiment of the present invention.

FIG. 8B illustrates an example of an output characteristic of the tilt sensor 118 when the video camera 100 is tilted as illustrated in FIG. 8A. In FIG. 8B, the vertical axis indicates the output voltage of the tilt sensor 118, the horizontal axis indicates the tilt of the tilt sensor 118, and a line 801 indicates the output of the tilt sensor 118 with respect to the tilt of the video camera 100. The gain of the amplifier circuit 119 that amplifies the output of the tilt sensor 118 is set such that it is within the range of the sensor output illustrated in FIG. 8B.

As can be seen from FIG. 8B, if the video camera 100 is at the normal position (i.e., center position in FIG. 8A, 0 degree tilt), the amplified output of the tilt sensor 118 will be half the power supply voltage Vcc supplied to the tilt sensor 118. On the other hand, if the video camera 100 is tilted up 90 degrees, as indicated by the video camera on the left side in FIG. 8A, the amplified output of the tilt sensor 118 is equal to the power supply voltage Vcc.

Further, if the video camera 100 is tilted down 90 degrees, as indicated by the video camera on the right side in FIG. 8A, the amplified output of the tilt sensor 118 is equal to the ground level GND. When the tilt angle is between –90 degrees and 0 degree or between 0 degree and 90 degrees, as the line 801 indicates, the output of the tilt sensor 118 changes linearly with respect to the tilt angle.

The output characteristics of the tilt sensor 118 will be reversed with respect to the output characteristics illustrated in FIG. 8B if the tilt sensor 118 is inversely mounted. After the tilt of the video camera 100 is detected using the output characteristic, the tilt angle is calculated, and the tilt state is determined accordingly.

Further, although a tilt of the video camera 100 in the up and down directions is discussed in the first exemplary embodiment, a tilt in the rotational direction with respect to the optical axis as the axis of rotation can be similarly detected by adjusting the detection axis of the tilt sensor 118.

Next, the calculation of the tilt angle and the determination of the tilt state performed by the camera/AF microcomputer 114 will be described referring to the flowchart illustrated in FIG. 9.

In step S901, the tilt signal of the tilt sensor 118 is amplified by the amplifier circuit 119 and converted from an analog signal into a digital signal by the A/D converter 120*a*. Then, the process proceeds to step S902.

In step S902, the digital value of the tilt signal input in step S901 is stored in the memory 120*b*. In step S903, the difference between the digital value of the current tilt signal and the digital value of the tilt signal that is stored last time in step S902 is calculated by the change amount calculation unit 120*c*, and the process proceeds to step S904. Step S904 is a process for calculating the difference in the tilt since the tilt changes according to the camera-work of the user.

In step S904, using the amount of change of the tilt signal calculated in step S903, the change in the tilt angle of the video camera 100 is calculated by the tilt angle calculation unit 120*d*. Then, the process proceeds to step S905.

As illustrated in FIG. 8B, the conversion of an amount of change into an angle is realized by preparing a table that includes, for example, data concerning the output voltage (output voltage 118 in FIG. 8B) of the tilt sensor 118 and the degree that corresponds to the output voltage for 1 LSB when the A/D conversion is performed by a 10 bit resolution.

In step S905, the change in the tilt angle calculated in step S904 is determined whether it is equal to or greater than the threshold value that is set in advance by the tilt state determination unit 120*e*. If the calculated tilt angle is equal to or greater than the threshold value (YES in step S905), then the process proceeds to step S906. If the calculated tilt angle is smaller than threshold value (NO in step S905), then the process proceeds to step S907.

An arbitrary angle (for example, 5 degrees or greater) can be set as the threshold. Further if an angle that is obtained by examination is used, accuracy can be improved.

In step S906, since the angle is determined to be equal to or greater than the threshold value by the tilt state determination unit 120*e*, the tilt change is detected (tilt change detected state).

Figure 2:
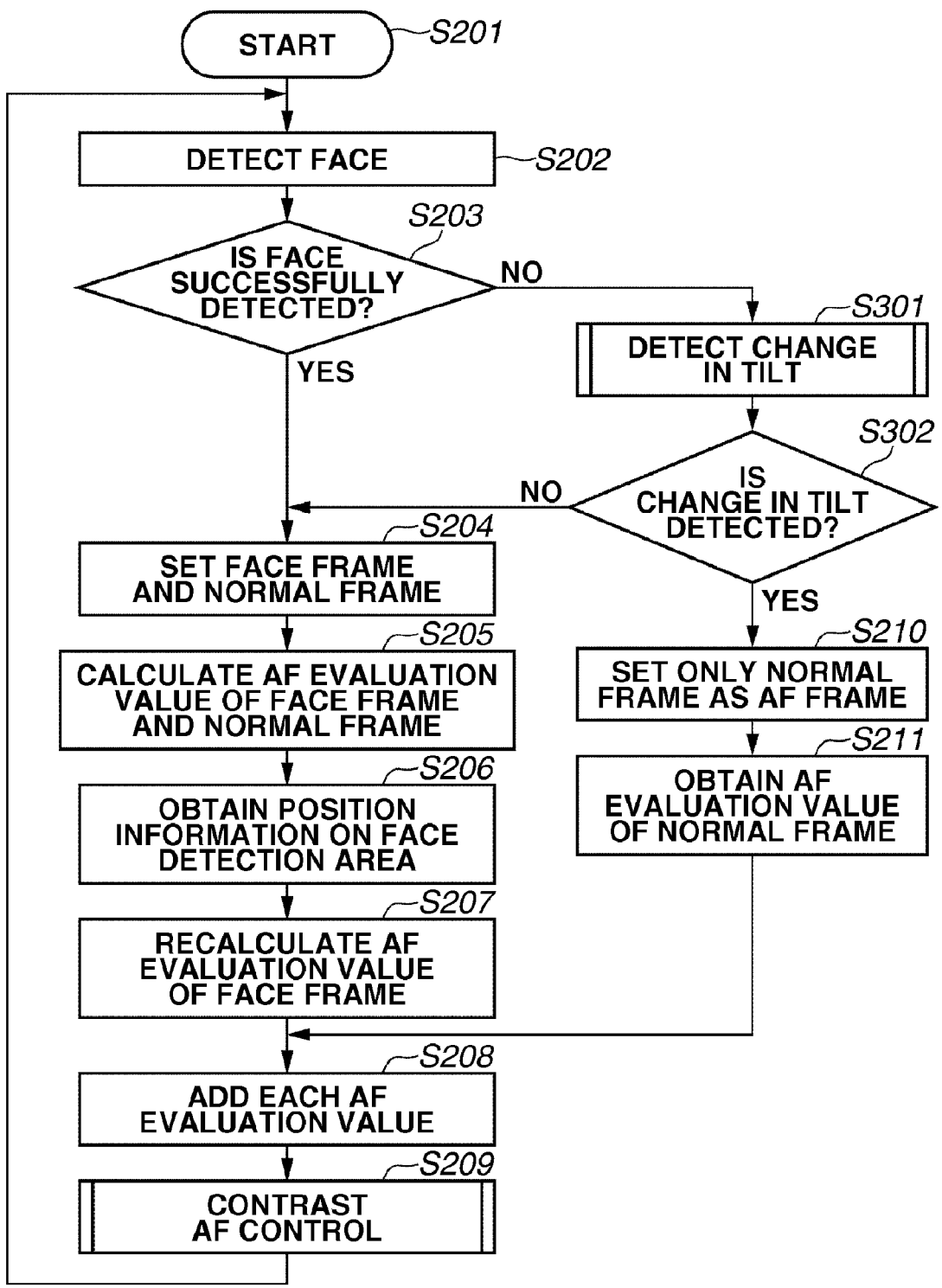
FIG. 2 is a flowchart illustrating AF control according to the first exemplary embodiment of the present invention.

If a face is not detected by the face detection unit 116 in FIG. 2 (NO in step S203), and the tilt change is detected as described above, then the video camera 100 is determined to be tilted a predetermined angle or greater due to the camera-work of the user (YES in step S302). Then information used for canceling the face frame is output immediately.

In step S907, since the angle is determined to be smaller than the threshold value by the tilt state determination unit 120*e*, the tilt change is not detected (tilt change undetected state).

If a face is not detected by the face detection unit 116 in FIG. 2 (NO in step S203), and the tilt change is not detected as described above, then the video camera 100 is determined not to be tilted a predetermined angle or greater due to the camera-work of the user (NO in step S302). Then information used for maintaining the face frame is output.

Next, switching between the face frame and the normal frame will be described referring to FIGS. 10A to 10C.

FIGS. 10A to 10C illustrate the face frame and the normal frame for an image captured by the video camera 100 when the frame used for the AF control is changed according to the first exemplary embodiment.

FIG. 10A illustrates an imaging screen where both the face frame and the normal frame are used for the AF control.

During imaging, in a case where a person as a main object turns his head away and thus the face detection temporarily cannot be detected, if the AF evaluation value of the face frame is immediately cancelled, then the stability of the AF will be decreased.

Thus, if a change in tilt that exceeds the threshold value due to the camera-work of the user is not detected, the AF control will be continued using the face frame as illustrated in FIG. 10B.

However, if the face is not detected, and further, if a tilt that exceeds the threshold value due to the camera-work of the user is detected, then the imaging screen is considered to have changed. Thus, as illustrated in FIG. 10C, the face frame is cancelled and removed from the screen. Accordingly, the AF control of the imaging will be performed based on the normal frame.

As described above, according to the first exemplary embodiment of the present invention, with the focus adjustment control using face detection, when a moving image is being captured, if it is determined that the tilt of the video camera is not changed, the imaging will be controlled as described below even if a face is not temporarily detected.

That is, under such condition, the face area that has been detected will be continuously used and the AF evaluation value of the face area will be used for controlling the focus adjustment. In this way, the main object intended by the user can be stably focused with accuracy.

A second exemplary embodiment of the present invention will now be described.

According to the first exemplary embodiment, if the face detection performed by the face detection unit 116 fails, based on the tilt signal output from the tilt sensor 118, the tilt state determination unit 120*e* determines whether the change in tilt of the video camera 100 is equal to or greater than a predetermined threshold value.

Further, if the change in tilt of the video camera 100 is smaller than the threshold value, the face frame is maintained while the AF control is performed. According to the second exemplary embodiment of the present invention, the threshold value of the amount of change in the tilt angle can be changed according to a focal length of the video camera 100.

Since the configuration of the video camera according to the present embodiment is similar to that described referring to FIG. 1 according to the first exemplary embodiment, the description will be omitted. Further, the AF control processes of the present embodiment are similar to those that are described referring to FIG. 2 according to the first exemplary embodiment, however, the tilt change detection processing in step S301 in FIG. 2 is different from the processing described referring to FIG. 9 according to the first exemplary embodiment.

Figure 11:
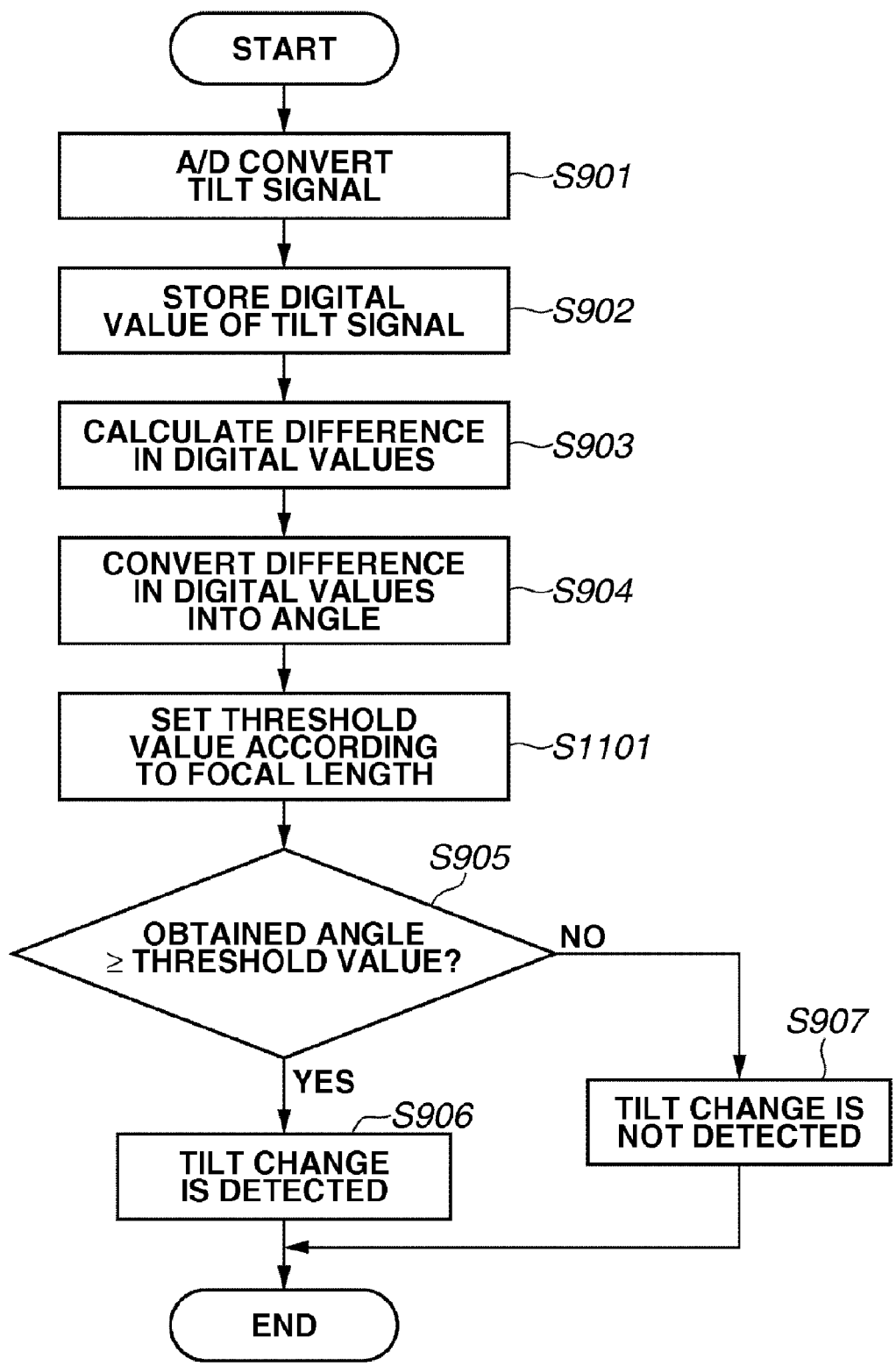
FIG. 11 is a flowchart illustrating calculation of a tilt angle and determination of a tilt state according to a second exemplary embodiment of the present invention.

Now, the tilt change detection processing according to the second exemplary embodiment will be described referring to FIG. 11. In FIG. 11, the processes similar to those in FIG. 9 are denoted by the same step numbers.

In step S901, the tilt signal of the tilt sensor 118 is amplified by the amplifier circuit 119 and is converted from an analog signal into a digital signal by the A/D converter 120*a*.

In step S902, the digital value of the tilt signal input in step S901 is stored in the memory 120*b*. In step S903, the difference between the digital value of the current tilt signal and the digital value of the tilt signal that is stored last time in step S902 is calculated by the change amount calculation unit 120*c*, and the process proceeds to step S904. Step S904 is a process for calculating the difference in the tilt since the tilt changes according to the camera-work of the user.

In step S904, using the amount of change of the tilt signal calculated in step S903, the change in the tilt angle of the video camera 100 is calculated by the tilt angle calculation unit 120d. Then, the process proceeds to step S1101.

As illustrated in FIG. 8B, the conversion from the amount of change into angle is realized by preparing a table that includes, for example, data concerning the output voltage of the tilt sensor 118 (output voltage 801 in FIG. 8B) and the degree that corresponds to the output voltage for 1 LSB when the A/D conversion is performed by a 10 bit resolution.

In step S1101, the focal length is obtained, and a threshold value used for comparing the change in tilt angle is set according to the focal length. More particularly, the threshold value is reset so that if the threshold value on the telephoto side is set to 1 degree, the threshold value increases if the focal length comes close to the wide-angle side.

This is because the amount of movement of the object position on an imaging plane with respect to the tilt changes depending on the focal length. After a threshold value based on the focal length is set, the process proceeds to step S905.

In step S905, the change in the tilt angle calculated in step S904 is determined whether it is equal to or greater than the threshold value set by the tilt state determination unit 120e in step S1101. If the calculated tilt angle is equal to or greater than the threshold value (YES in step S905), then the process proceeds to step S906. If the calculated tilt angle is smaller than threshold value (NO in step S905), then the process proceeds to step S907.

In step S906, since the angle is determined to be equal to or greater than the threshold value by the tilt state determination unit 120e, the tilt change is detected (tilt change detected state).

If a face is not detected by the face detection unit 116 in FIG. 2 (NO in step S203), and the tilt change is detected as described above, then the video camera 100 is determined to be tilted a predetermined angle or greater due to the camerawork of the user (YES in step S302). Then information used for canceling the face frame is output immediately.

In step S907, since the angle is determined to be smaller than the threshold value by the tilt state determination unit 120e (NO in step S905), the tilt change is not detected (tilt change undetected state).

If a face is not detected by the face detection unit 116 in FIG. 2 (NO in step S203), and the tilt change is not detected as described above, then the video camera 100 is determined not to be tilted a predetermined angle or greater due to the camera work of the user (NO in step S302). Then information used for maintaining the face frame is output.

As described above, according to the second exemplary embodiment, since the threshold value used for comparing the change in the tilt angle is changed according to the focal length, in addition to the effect obtained from the first exemplary embodiment, stable focus adjustment can be obtained with higher accuracy.

According to the above-described embodiments, a human face is detected as an object (object to be in-focused) by the face detection unit 116. However, a particular object other than the human face, for example, an animal or a vehicle may be used. Further, the object may be determined by inputting a position of an object in the imaging screen using an external input unit or a position in the imaging screen can be determined by detecting a line of sight of the user who is looking at the finder.

Figure 12:
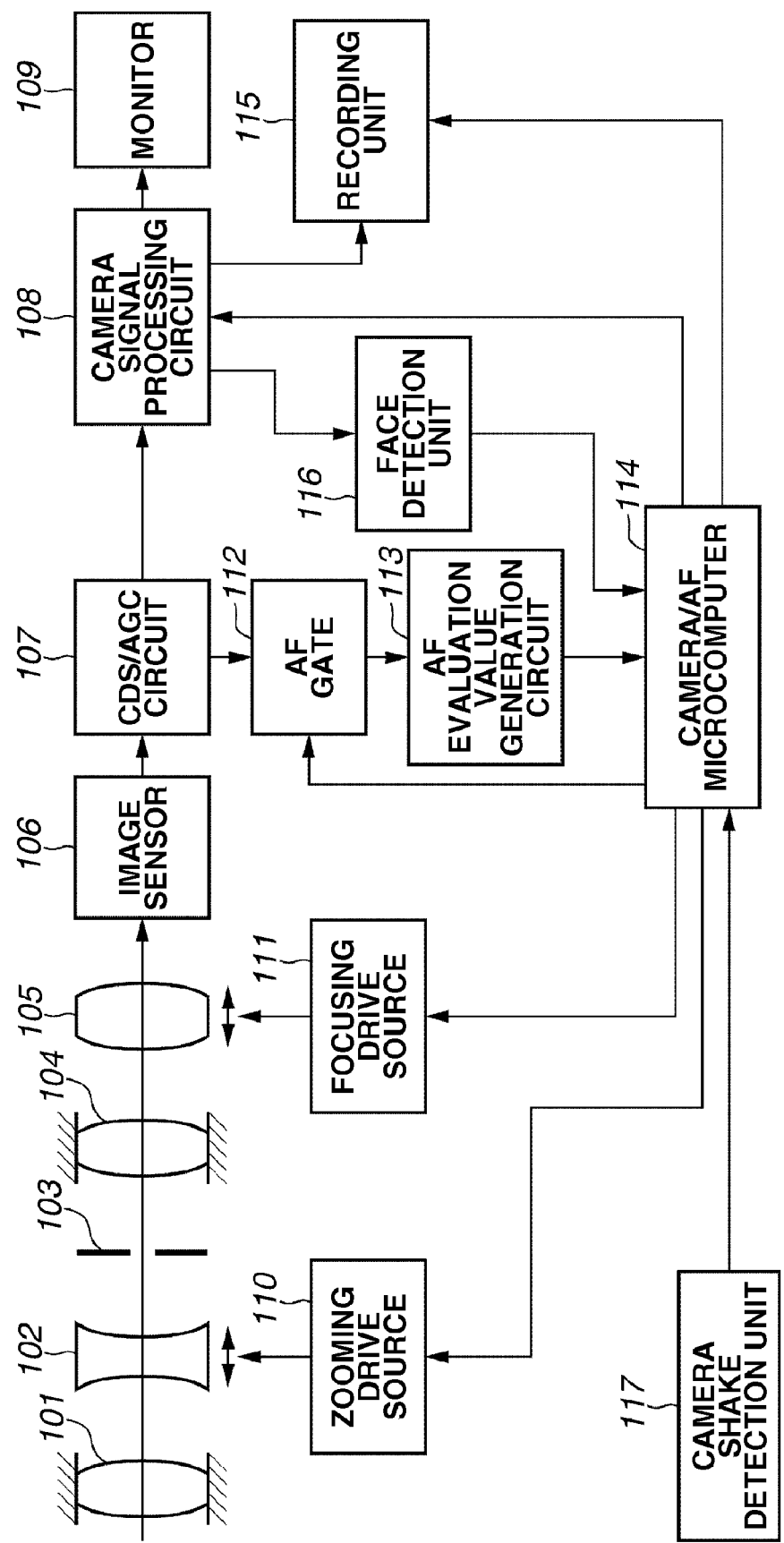
FIG. 12 is a block diagram illustrating a configuration of a video camera according to a third exemplary embodiment of the present invention.

FIG. 12 is a block diagram illustrating a configuration of a video camera as an example of an imaging apparatus according to a third exemplary embodiment of the present invention. Since the configuration of the video camera according to the third exemplary embodiment is similar to that of the first exemplary embodiment, which is described referring to FIG. 1 except for a shake detection unit, the same components are given the same reference numerals and their detailed description will not be repeated.

In FIG. 12, a shake detection unit 117 detects a camera shake of the video camera at the time of imaging. The shake detection unit 117 includes an angular velocity sensor such as a gyroscopic sensor. A shake signal, which is output from the shake detection unit 117, is input in the camera/AF microcomputer 114. After predetermined filtering processing and integration processing, the signal is used as a control signal for a shake correction system (not illustrated) as a signal that indicates angular displacement of the video camera.

As the shake correction system, an optical method is known in which a prism or a lens member that allows optical axis deflection is arranged on an optical path of the imaging light that is incident on the image sensor, and the optical axis is deflected according to the camera shake.

According to an electronic shake correction method, a position where a part of an image is taken from an entire image obtained by an image sensor is controlled, and the shake is corrected using the image taken from the controlled position.

Further, according to another electronic shake detection method, an amount of a movement of a camera is calculated based on a change of an image signal between fields, and the calculated amount of movement is determined as an amount of camera shake. The detection method is used for many electronic shake correction methods.

According to the electronic shake correction method, image correction is performed by extracting an image from a field memory, which is used for detecting a motion vector, in such a way as to remove the movement of an image stored in the field memory.

Next, focus adjustment control (AF control) of the camera/AF microcomputer 114 will be described referring to FIGS. 3 to 6 and 13. The AF control is executed by the camera/AF microcomputer 114 executing a computer program stored in the camera/AF microcomputer 114.

Figure 13:
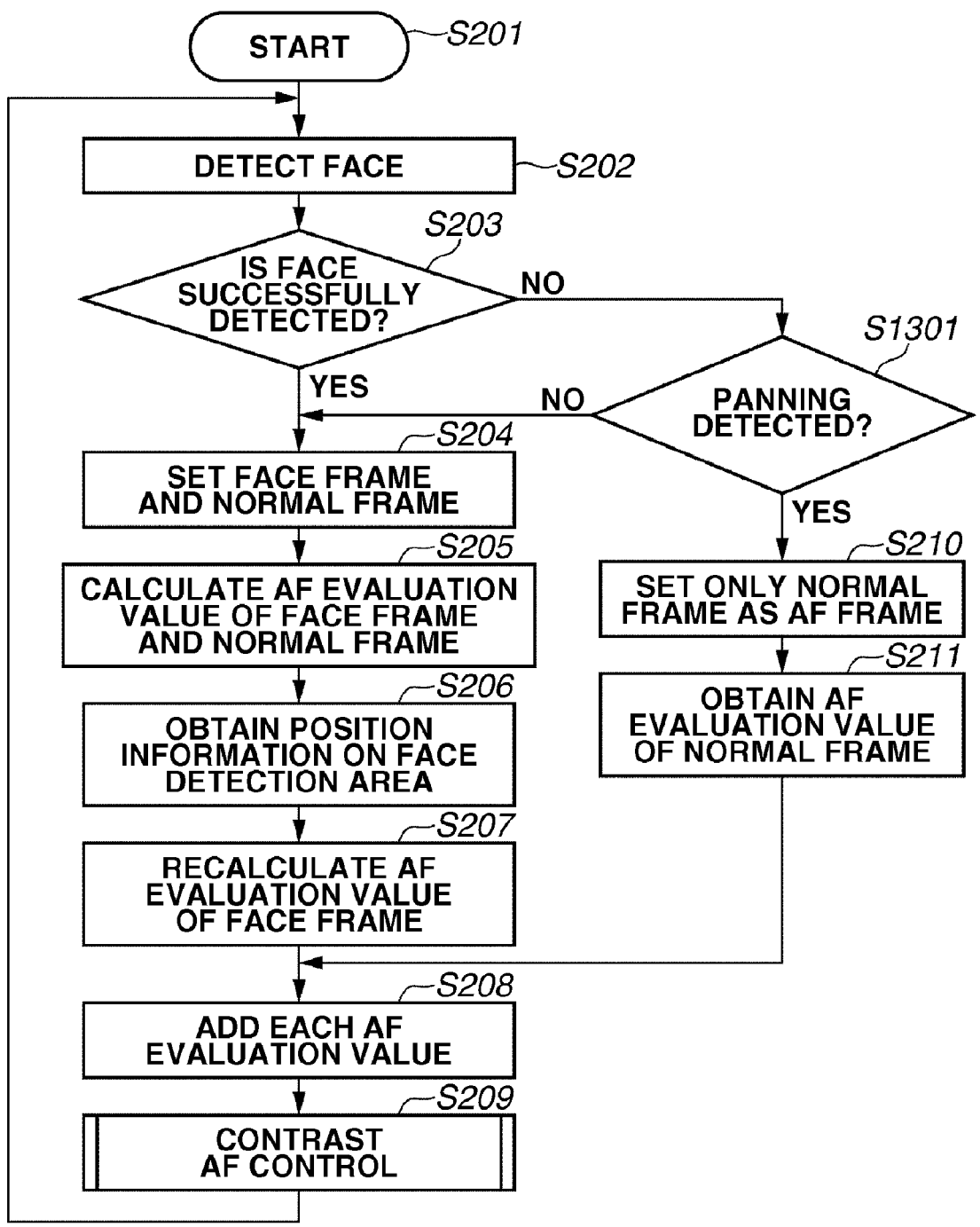
FIG. 13 is a flowchart illustrating AF control according to the third exemplary embodiment of the present invention.

First, the AF control executed by the camera/AF microcomputer 114 will be described referring to the flowchart illustrated in FIG. 13.

In step S201, the AF control process is started. In step S202, the camera/AF microcomputer 114 performs the face detection processing on the object image obtained by the face detection unit 116, the process proceeds to step S203. The face detection processing in step S202 is performed using a known method.

In step S203, the camera/AF microcomputer 114 determines whether a face is detected. If a face is detected (YES in step S203), the process proceeds to step S204. If a face is not detected (NO in step S203), then the process proceeds to step S301.

In step S204, the camera/AF microcomputer 114 sets a face frame for defining the area that includes a face as an AF frame for defining the focus detection area as well as a normal frame for determining a normal focus detection area, and the process proceeds to step S205.

An example of an AF frame set in step S204 is illustrated in FIG. 3. In step S205, the camera/AF microcomputer 114 acquires an AF evaluation value of image signal each obtained from pixels respectively in the face frame and the normal frame that are set in step S204, and the process proceeds to step S206.

In step S206, the camera/AF microcomputer 114 acquires position information of the face detection area on a screen based on a distance from the predetermined coordinates, and the process proceeds to step S207.

Although the central coordinates of the screen may be used as the predetermined coordinates, considering imaging of a human figure, since the human face is often positioned at the upper portion of the screen, although it depends on the angle of view, it is useful to set the face on the upper portion of the screen.

In step S207, based on the position information of the face frame acquired in step S206, the camera/AF microcomputer 114 recalculates the AF evaluation value of the face frame using weighted calculation by multiplying a predetermined ratio that is changed according to a position of the face on the screen.

For example, if a person comes in the imaging angle from outside of the screen during imaging, the ratio of weighting used for the AF control is changed according to the position of the face frame, whether it is at the corner of the screen or in the vicinity of the center of the screen. FIG. 4 illustrates an example of a case where a plurality of face frames are arranged in different positions. When the recalculation of the AF evaluation value of the face frame is completed, then the process proceeds to step S208.

In step S208, the camera/AF microcomputer 114 adds the AF evaluation value of the face frame that is recalculated (weighted calculation) in step S207 and the AF evaluation value of the normal frame so as to obtain a final AF evaluation value. Then, the process proceeds to step S209.

Figure 5:
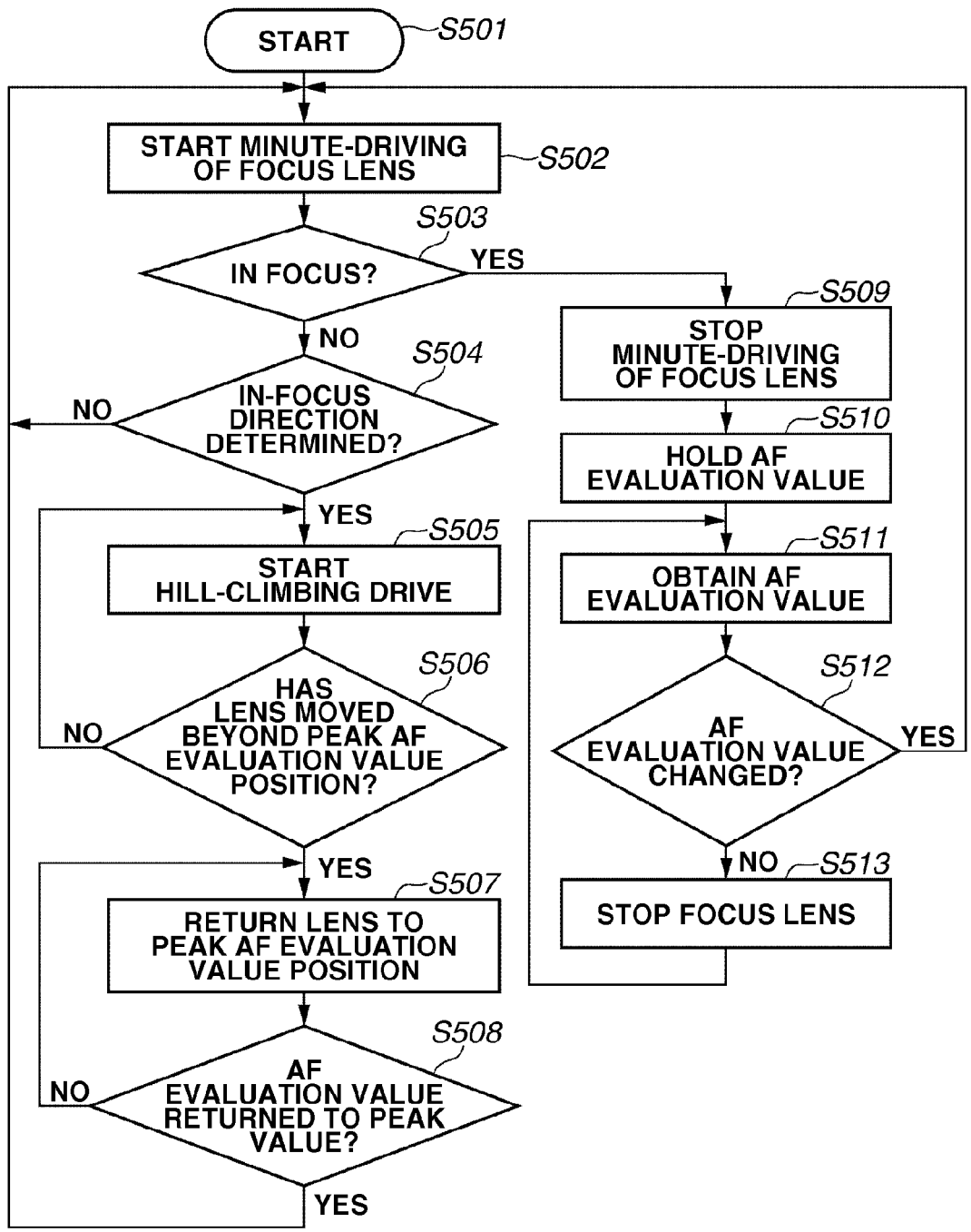
FIG. 5 is a flowchart illustrating contrast AF control processing according to the exemplary embodiment of the present invention.

In step S209, the camera/AF microcomputer 114 performs contrast AF type focus adjustment (see FIG. 5). Then, the process returns to step S202 and the processes of the above-described AF control are repeated.

Next, a case where the face is not detected in step S203 and the process proceeds to step S1301 will be described.

In step S1301, the camera/AF microcomputer 114 determines whether panning is performed by the user according to a shake state of the video camera that is determined based on a shake signal detected by the shake detection unit 117. If the panning is not determined (NO in step S1301), then the process proceeds to step S204 and a process that is performed when the face is detected in step S203 is performed.

Although the process proceeds to step S1301 only when the face is not detected, the camera/AF microcomputer 114 holds the face frame as the AF frame until the operation is determined to be a panning operation. Thus, by reducing the change in the AF evaluation value, a stable in-focus state can be obtained.

If the panning is detected (YES in step S1301), then the process proceeds to step 210. In step S210, the camera/AF microcomputer 114 sets only the normal frame as the AF frame. When the normal frame is set, a small frame is simultaneously set at the center of the normal frame.

In step S211, since the normal frame is set in step S210, the camera/AF microcomputer 114 acquires an AF evaluation value of the normal frame, and the process proceeds to step S208 and then step S209, so that the contrast AF control is performed.

The contrast AF control performed by the camera/AF microcomputer 114 in step S209 is described above referring to FIG. 5. Thus its description is omitted.

Next, determination of a shake state of the video camera using a shake signal detected by the shake detection unit 117 will be described referring to FIGS. 14 and 15.

Figure 14:
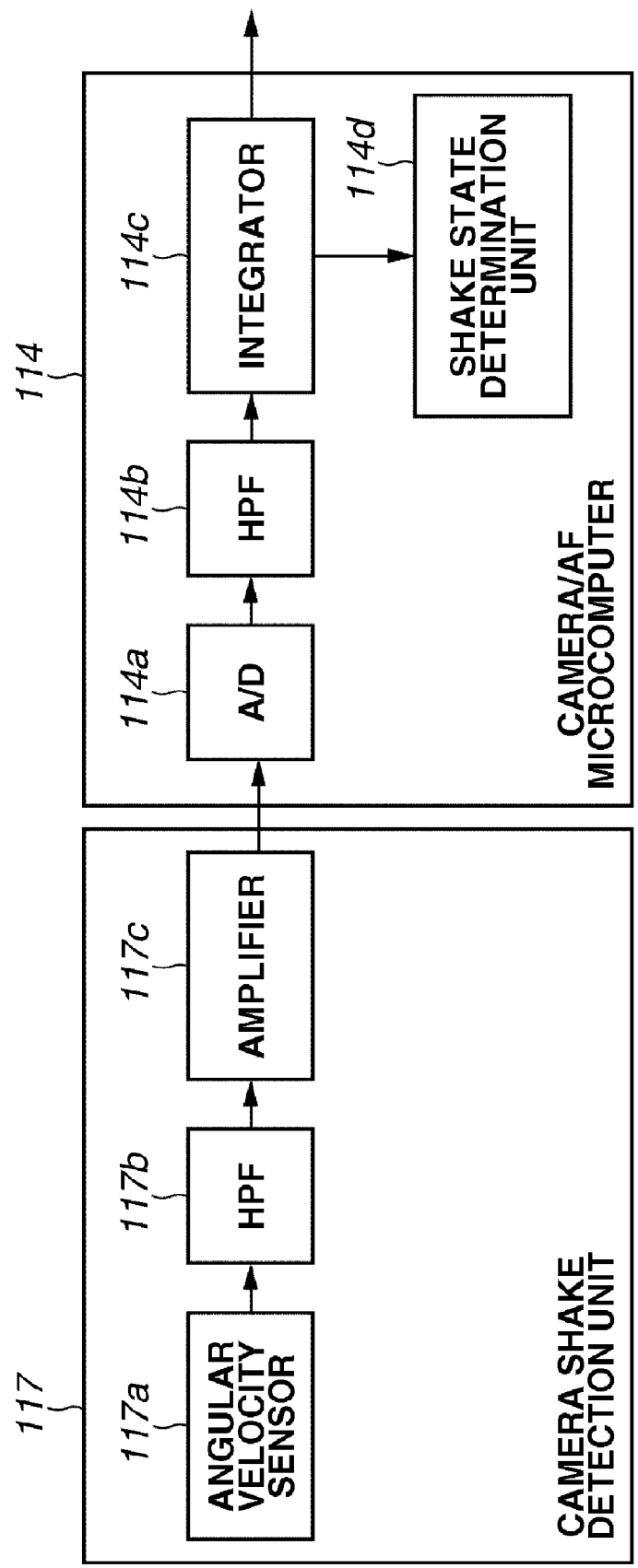
FIG. 14 is a block diagram illustrating a shake detection unit and a configuration used for determining a shake state.
Figure 15:
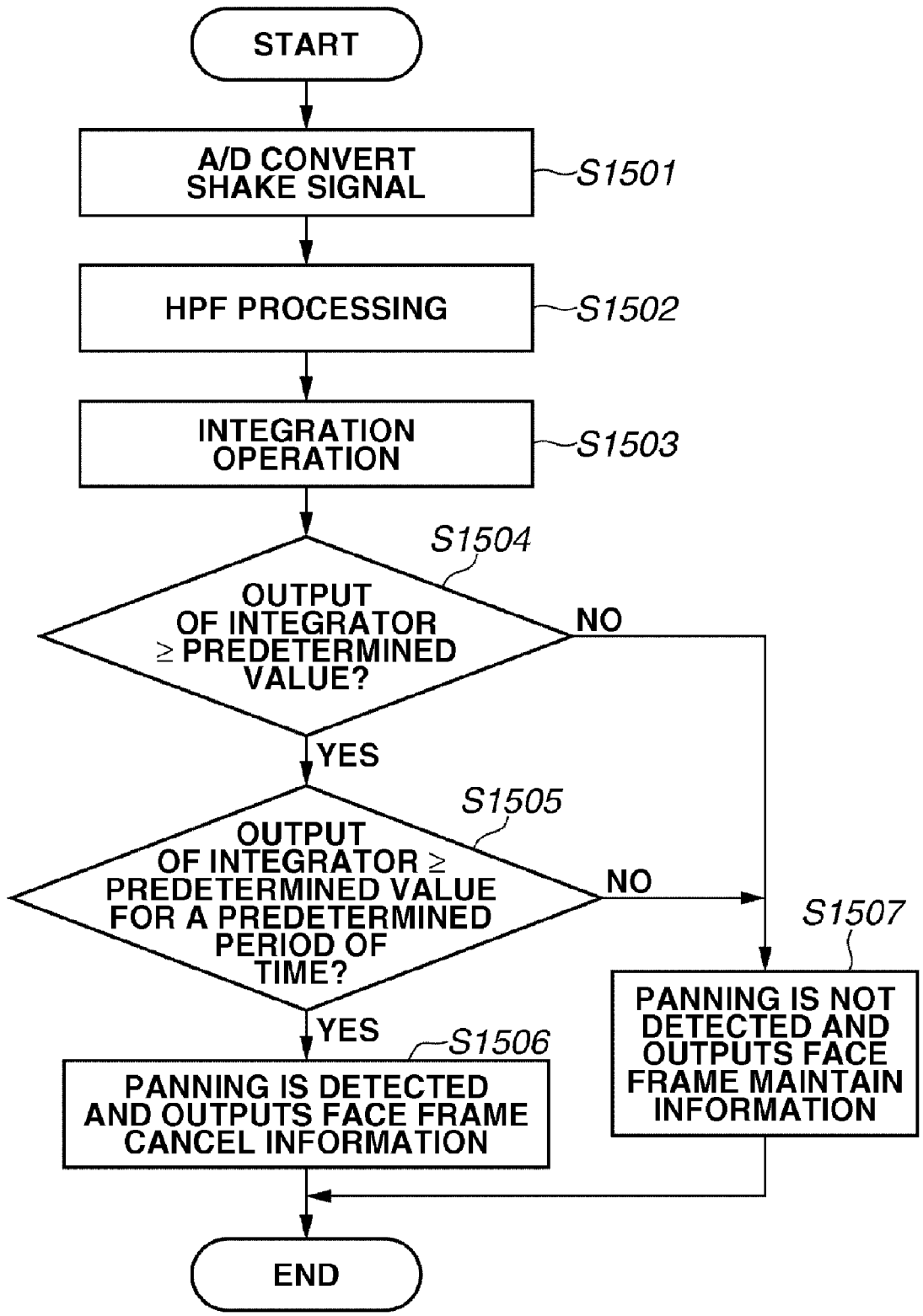
FIG. 15 is a flowchart illustrating panning detection processing according to the third exemplary embodiment of the present invention.

FIG. 14 is a block diagram illustrating a shake detection unit 117 used for detecting a shake of the video camera and components that determines a shake state of the video camera using the output of the shake detection unit 117.

In FIG. 14, the shake detection unit 117 includes an angular velocity sensor 117a for detecting a shake of the video camera, a high frequency pass filter (HPF) 117b for removing a DC component from the output of the angular velocity sensor 117a, and an amplifier 117c for amplifying the output of the HPF 117b for a predetermined amount.

The signal output from the shake detection unit 117 is input in the camera/AF microcomputer 114. An A/D converter 114a converts the input signal, which is analog, into a digital signal, a HPF 114b removes a DC component from the signal output from the A/D converter 114a, and an integrator 114c integrates the signal output from the HPF 114b.

The integrator 114c outputs a control signal that is input into a shake correction system (not illustrated). Further the output of the integrator 114c is input in a shake state determination unit 114d. A predetermined threshold value is set for the shake state determination unit 114d. The shake state determination unit 114d determines whether the video camera is panning based on whether the output of the integrator 114c is equal to or greater than the threshold value (step S1301 in FIG. 13).

As described above, the result of the determination is used only when the determination of the face detection fails. Since the panning may be temporarily detected according to, for example, a camera shake amount due to the user, a time after the output of the integrator 114c is equal to or exceeds a predetermined threshold value can be included as a condition used in determining the panning.

For simplification of description, although the video camera 100 includes two systems, one for panning and the other for tilting, the block diagram illustrated in FIG. 14 includes the angular velocity sensor 117a, the HPF 117b, the amplifier 117c as well as the A/D converter 114a, the HPF 114b, the integrator 114c, and the shake state determination unit 114d in the camera/AF microcomputer 114 for one system.

Next, the panning detection performed in the camera/AF microcomputer 114 will be described referring to the flowchart illustrated in FIG. 15.

In step S1501, the analog signal output from the shake detection unit 117 is input in the A/D converter 114a and converted into a digital signal. In step S1502, the HPF 114b performs the HPF processing. More specifically, the HPF 114b removes the DC component that is generated due to the A/D conversion of the shake detection signal input in step S1501. Then, the processing proceeds to step S1503.

In step S1503, the shake detection signal after the HPF processing is integrated by the integrator 114c, converted into an angular displacement signal, and used as a control signal for the shake correction system (not illustrated). Additionally, the angular displacement signal is used in determining the shake state of the video camera.

In step S1504, the output of the integrator 114c is determined whether it is equal to or greater than a predetermined value. If the output is equal to or greater than the predetermined value (YES in step S1504), then the process proceeds to step S1505. If the output is smaller than the predetermined value (NO in step S1504), the process proceeds to step S1507.

In step S1507, it is determined that panning of the video camera is not detected (panning undetected state). Even if a face is not detected by the face detection unit 116, the face frame is not immediately cancelled and face frame maintain information that is used for maintaining the face frame is output.

In step S1505, since the output of the integrator 114c is determined to be equal to or greater than a predetermined value in step S1504, it is determined whether that state (output of integrator ≧ predetermined value) has been continued for a predetermined period of time. This process is provided so as to eliminate the possibility of a case where the state of the camera temporarily satisfies the determination condition due to an amount of camera shake of the user. This process helps improve stability of panning detection.

If the state (output of integrator≧predetermined value) is determined to continue for a predetermined period of time (YES in step S1505), then the process proceeds to step S1506. If the state is determined not to continue for a predetermined period of time (NO in step S1505), then the process proceeds to step S1507.

In step S1506, since the output of the integrator 114c is determined to be equal to or greater than a predetermined value in step S1504 and that that the state is determined to continue for a predetermined period of time in step S1505, the panning of the video camera is determined.

Since the video camera is moving (panning), the face is not detected by the face detection unit 116. Thus face frame cancel information that is used for canceling the face frame is output immediately so that the face frame is cancelled.

Figure 16:
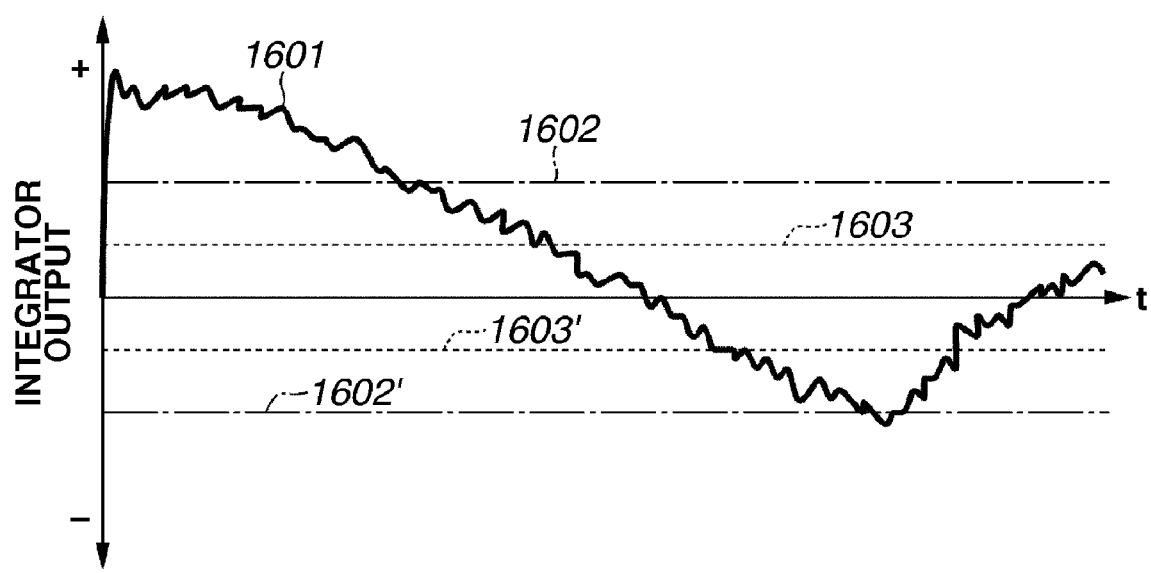
FIG. 16 is a graph illustrating a threshold value used for detecting panning according to the third exemplary embodiment of the present invention.

Next, output of the integrator 114c when the video camera is panned by the user will be described referring to FIG. 16. In FIG. 16, the vertical axis represents output of the integrator and the horizontal axis represents time. An output 1601 is an output of the integrator 114c. Threshold values 1602 and 1602' are threshold values for the panning detection. Threshold values 1603 and 1603' are threshold values for determining the end of the panning.

If the output of the integrator 114c is equal to or greater than the threshold values 1602 and 1602' for the panning detection, and that state continues for a predetermined period of time, then the panning is detected.

Further, after the output of the integrator 114c continues to be equal to or greater than the threshold values 1602 and 1602' for a predetermined period of time, if the output decreases to the threshold values 1603 and 1603' or lower, then the panning is determined to end.

Next, the shift between the face frame and the normal frame which are set by the above-described processing will be described referring to FIGS. 17A to 17C.

FIGS. 17A to 17C illustrate a face frame and a normal frame used for the AF control in capturing an image by the video camera according to the third exemplary embodiment.

FIG. 17A illustrates an imaging screen displaying the face frame and the normal frame that are used for the AF control. FIG. 17B illustrates an imaging screen that displays the normal frame and the face frame in a case a person, being the main object, turns his head away during the imaging, and thus the face is temporarily not detected.

Conventionally, if the face cannot be detected, the AF evaluation value of the face frame has been cancelled. However, if the AF evaluation value is cancelled immediately after the failure of the face detection is determined, then the AF control becomes unstable. Thus, according to the third exemplary embodiment, if the panning of the video camera is not detected, the AF control will be performed while maintaining the face frame. Thus, although a face is not detected, the imaging screen in FIG. 17B is the same as the one illustrated in FIG. 17A.

However, if the face cannot be detected and the panning is detected, then it is considered that the imaging screen is changed. Thus, the face frame is deleted and the AF control is performed using only the normal frame. This case is illustrated in FIG. 17C.

As described above, according to the third exemplary embodiment, if a face cannot be detected by the face detection function when a moving image is captured, and if the video camera is determined as not in a panning state from the shake state, the face frame will be maintained and the AF evaluation value will be calculated.

Then, the AF processing is performed using the calculated AF evaluation value. In this way, the user can obtain a stable focus adjustment with high accuracy using the face detection function for the intended main object.

Next, a fourth exemplary embodiment of the present invention will be described.

In the above-described third exemplary embodiment, if the face cannot be detected by the face detection unit 116, whether the video camera is panning is determined by the shake state determination unit 114d based on an output state of the shake detection unit 117, and the AF processing is performed using the obtained result.

According to the fourth exemplary embodiment, the detection of the shake of the video camera and the determination of the shake state are determined using motion vector.

Figure 18:
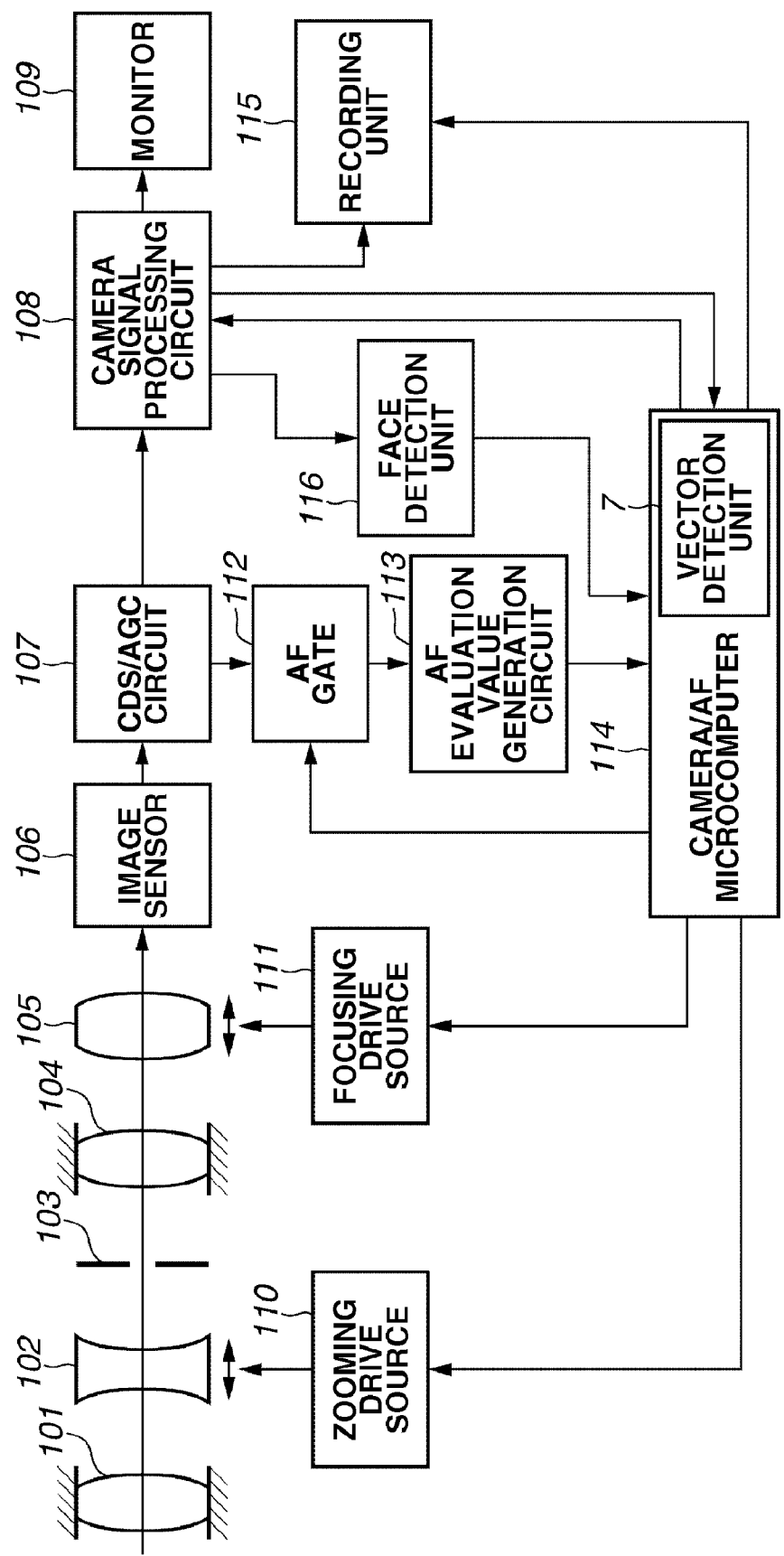
FIG. 18 is a block diagram illustrating a configuration of a video camera according to a fourth exemplary embodiment of the present invention.

FIG. 18 is a block diagram illustrating a configuration of a video camera according to the fourth exemplary embodiment of the present invention. Since the configuration of the video camera according to the present embodiment is similar to that of the third exemplary embodiment that is described referring to FIG. 12 except for a vector detection unit 7, which is included in the camera/AF microcomputer 114 and used for detecting the motion vector (thus the shake detection unit 117 is not necessary), the components are given the same reference numerals and their detailed description will not be repeated.

Figure 19:
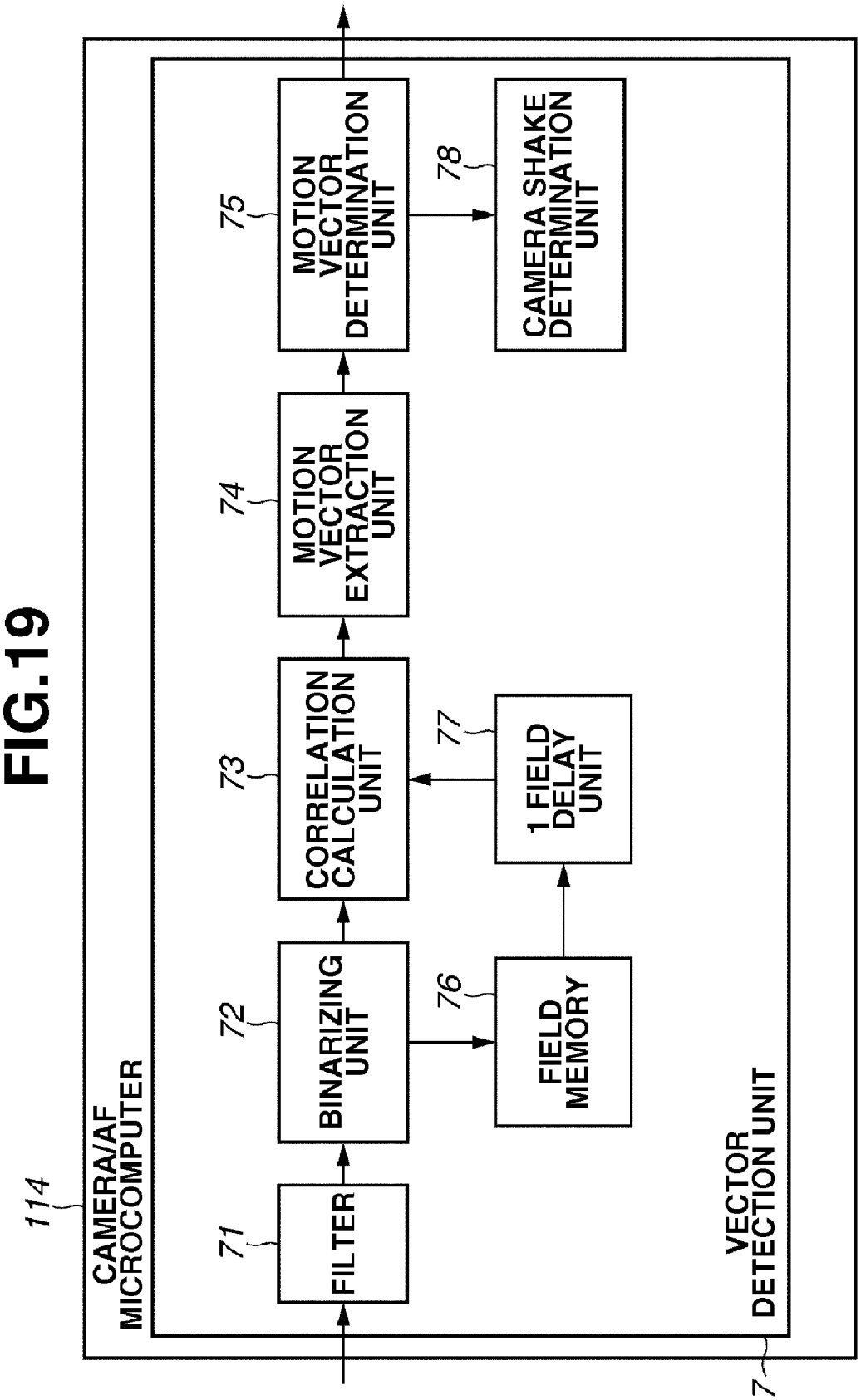
FIG. 19 is a block diagram illustrating a configuration of a vector detection unit according to the fourth exemplary embodiment of the present invention.

The vector detection unit 7 will now be described referring to FIG. 19.

A signal (luminance signal) output from the camera signal processing circuit 108 is input in a filter 71. The filter 71 extracts spatial frequency components that are useful in detecting a motion vector from the signal that is input, and removes a high frequency component.

The signal that passed through the filter 71 is binarized by a binarizing unit 72 using a predetermined threshold value as a reference value. A binarized signal ("binarized image") which is a signal binarized by the binarizing unit 72 is temporarily stored in a field memory 76 and then read out by a one-field delay unit 77 in a one-field delayed manner.

A correlation calculation unit 73 shifts a binarized image of a previous field stored in the field memory 76 on a pixel-by-pixel basis and compares the image of the previous field with a binarized image of the present field from the binarizing unit 72. Then, the correlation calculation unit 73 detects a position at which the area where the pixel values match between the binarized images of the previous field and the present field in a predetermined range becomes largest.

Figure 20:
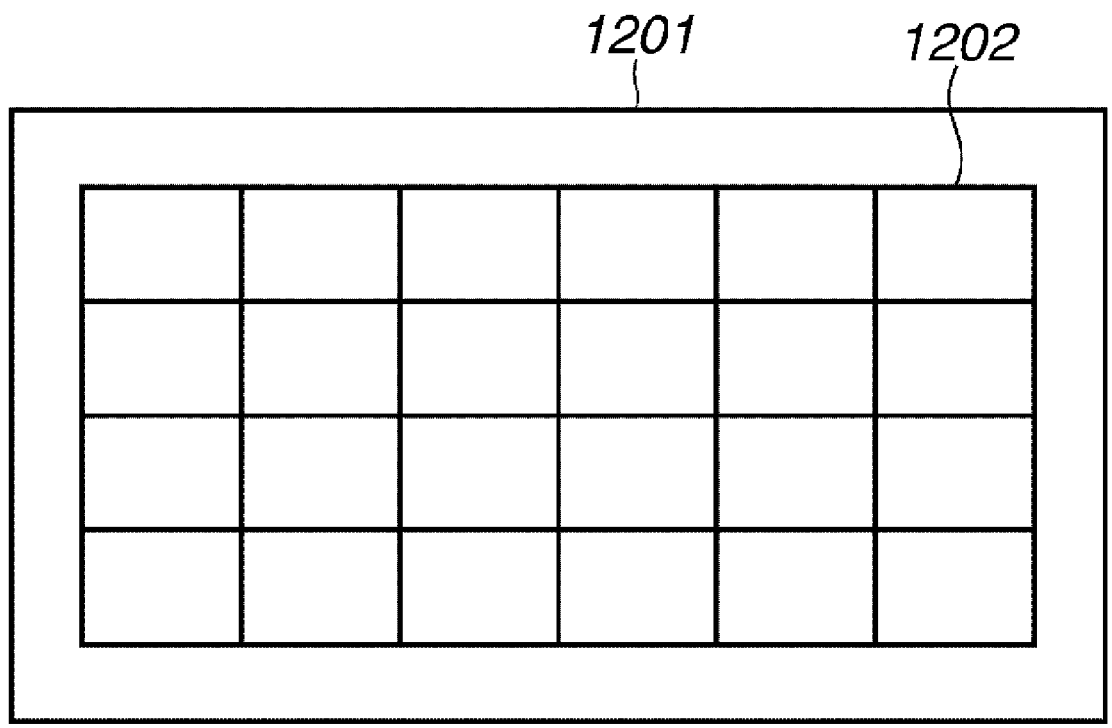
FIG. 20 illustrates areas used for detecting a motion vector according to the fourth exemplary embodiment of the present invention.

In the actual detection, such an operation is performed for each detection area 1202 that is illustrated in FIG. 20. The detection area 1202 is obtained by dividing a binarized image (motion vector search area) 1201 of one field into a plurality of areas.

Then, a motion vector extraction unit 74 extracts (calculates) a motion vector for each detection area taken from two consecutive field images (binarized images). The motion vector may also be detected from two consecutive frame images.

According to the present embodiment, in extracting (calculating) the motion vector, a block of a field before the current field where the correlation value is minimum is searched, and the relative displacement is expressed as a motion vector.

The motion vector obtained from each detection area is supplied to a motion vector determination unit 75. The motion vector determination unit 75 determines one motion vector for each interfield (between two consecutive field images). This motion vector is determined as a motion vector that represents the interfield.

The motion vector determination unit 75 can be used, for example, for determining a representative motion vector of an interfield. In determining such a motion vector, the motion vector determination unit 75 generates a histogram of the motion vectors of the detection areas of an interfield and determines the median value as the representative motion vector.

The motion vector determined by the motion vector determination unit 75 is input in a shake state determination unit 78 where the motion vector is examined its size and direction. According to the result of the examination, the video camera is determined whether the panning is being performed. The result of the determination is used in the display of the face frame by the face detection unit 116.

Figure 21:
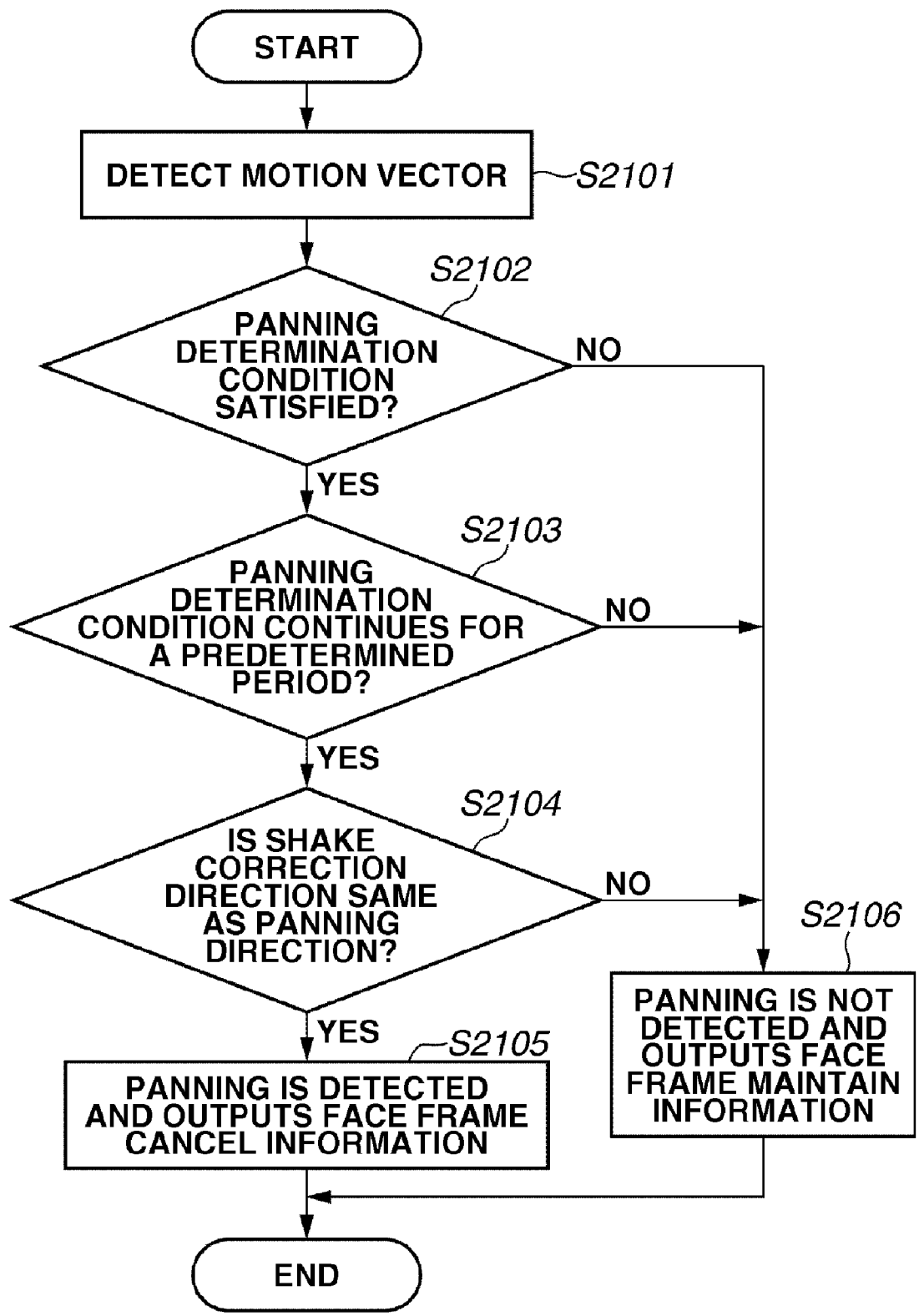
FIG. 21 is a flowchart illustrating the panning detection processing using a motion vector according to the fourth exemplary embodiment of the present invention.

Next, processes for detecting the panning using the vector detection will be described referring to the flowchart illustrated in FIG. 21.

In step S2101, the motion vector extraction unit 74 detects the motion vector, the process proceeds to step S2102. According to the present embodiment, the motion vector is detected using a block matching method as described above. The input image signal is divided into a plurality of blocks (e.g., 8 pixels×8 lines) of an appropriate size, and the motion vector is detected for each block.

For each block, a difference between pixels and pixels in a predetermined range in a previous field (or a previous frame) and current field is calculated, a sum of an absolute value of the difference is calculated, and a block of a previous field (or a previous frame) where the sum is smallest is searched. Then, a relative displacement between the block that is searched and the block of current field represents the motion vector of the block.

In step S2102, the shake state determination unit 78 determines whether the video camera is panning based on the motion vector detected in step S2101.

The determination condition of whether the video camera is panning is set according to whether a majority (e.g., 90% or more) of vectors detected in the detection areas are in a same direction. The optimum value can be determined according to examination.

Figure 22:
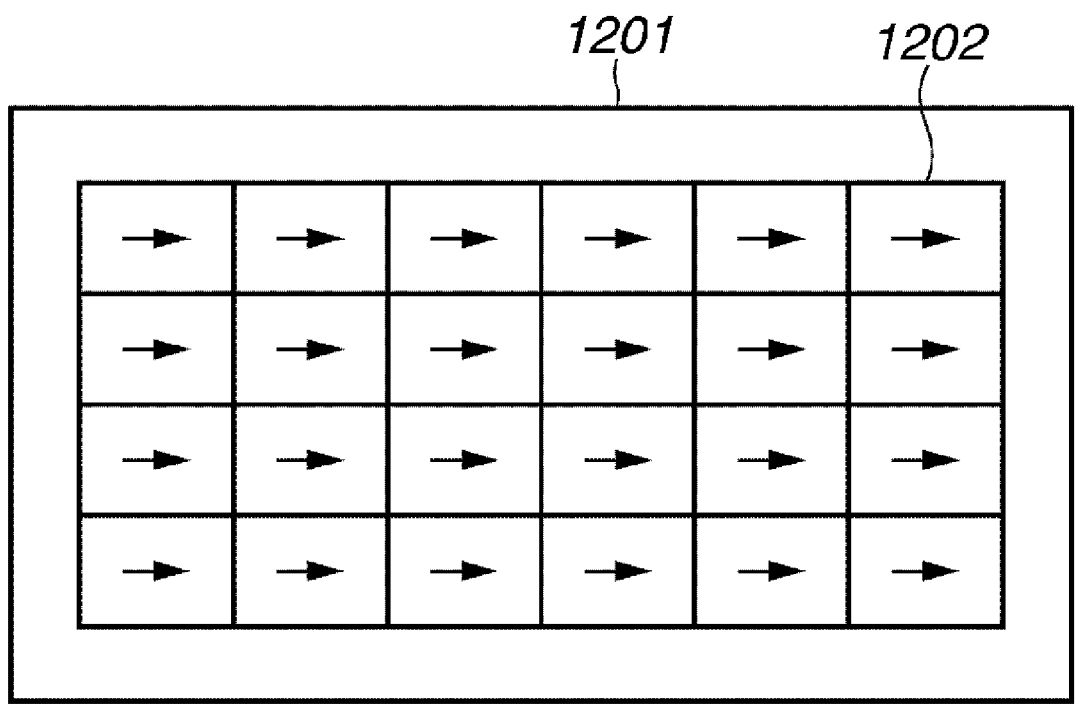
FIG. 22 illustrates motion vectors used for detecting panning according to the fourth exemplary embodiment of the present invention.

FIG. 22 illustrates an example of motion vectors determined by the vector detection unit 7. According to this example, since each vector in each detection area has a same magnification and direction, the shake state determination unit 78 determines that the video camera is panning.

In step S2102, if the condition for determining the panning state is satisfied (YES in step S2102), then the process proceeds to step S2103. If the condition is not satisfied (NO in step S2102), then the process proceeds to step S2106.

In step S2103, whether the panning determination condition determined in step S2102 continues for a predetermined period of time is determined. The predetermined time may be set based on a cycle being a basis of the control cycle of the video camera (e.g., vertical sync period).

If the panning determination condition continues for a predetermined period of time (YES in step S2103), then the process proceeds to step S2104.

If the panning determination condition does not continue for a predetermined period of time (NO in step S2103), then the process proceeds to step S2106.

In step S2104, whether a correction direction of a correction system that corrects the shake is the same as the panning direction is determined. According to the shake correction using the motion vector, since the correction system moves in a direction that cancels the detected motion vector, if the panning continues for a long time, the correction system will be moved to the correction end. Thus the video camera is determined to be moving in the same direction.

If the correction direction of the shake correction system is the same as the panning direction (YES in step S2104), then the video camera is determined to be in the panning state, and the process proceeds to step S2105. If the correction direction of the shake correction system is determined to be different from the panning direction (NO in step S2104), the process proceeds to step S2106.

In step S2105, since determination results in all of steps S2102, S2103, and S2104 are "YES", the video camera is determined to be panning (panning detected state). Since the video camera is moving (panning), a face cannot be detected by the face detection unit 116. Thus, the face frame cancel information used for canceling the face frame is output.

Further, if determination result in any one of steps S2102, S2103, and S2104 is "NO", in step S2106, the video camera is determined as not panning (panning undetected state). Even if a face cannot be detected by the face detection unit 116, the face frame is not immediately cancelled, and the face frame maintain information used for maintaining the face frame is output.

As described above, according to the fourth exemplary embodiment, effect similar to what is obtained according to the third exemplary embodiment is obtained by a detection of whether the video camera is panning using a motion vector. Further, since the shake detection unit is unnecessary, the configuration can be simplified.

According to the above-described embodiments, a human face is detected as an object by the face detection unit 116. However, a particular object other than a human face, for example, an animal or a vehicle may also be detected.

Further, in detecting the object, a position on the imaging screen can be input by the user using an external input unit, or a position on the imaging screen can be determined by detecting a line of sight of the user looking through a finder.

The present invention can be applied to a system including a plurality of devices, for example, a host computer, an interface apparatus, camera head or to an apparatus including a single device, for example, a digital video camera or a digital still camera.

The present invention can be also achieved by supplying a storage medium (or a recording medium) for storing a software program code which is configured to realize a function of the above-described exemplary embodiments, to a system or an apparatus and reading out and executing the program code stored in the storage medium by a computer (or CPU or MPU) of the system or the apparatus. In this case, the program code read out from the storage medium itself realizes the functions of the above-described exemplary embodiments and the program code and the storage medium which stores the program code also falls within the scope of the present invention.

When the computer executes the program code that has been read out, the functions of the aforementioned exemplary embodiment are realized.

For example, an operating system (OS) or the like which runs on a computer can execute a part or whole of the actual processing based on an instruction of the program code so that the function of the above-described exemplary embodiments can be achieved. A storage medium for storing the program includes a flexible disk, a hard disk, a read-only memory (ROM), a random access memory (RAM), an optical disk, and a magneto-optical disk. Further, a computer network such as a local area network (LAN) or a wide area network (WAN) can be used in supplying the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2008-208082 filed Aug. 12, 2008, and 2008-223917 filed Sep. 1, 2008, which are hereby incorporated by reference herein in their entirety.

What is claimed is:

1. An imaging apparatus comprising:
a detection unit configured to detect an object image to be focused from an image signal obtained by imaging;
a setting unit configured to set a focus detection area used for acquiring an AF evaluation value that indicates a focus state of an imaging optical system;
a focus adjustment unit configured to perform focus adjustment by acquiring the AF evaluation value based on the image signal obtained from the focus detection area, and by moving the imaging optical system based on the AF evaluation value; and
a determination unit configured to determine whether a tilt of the imaging apparatus is changed;
wherein the setting unit maintains setting of the focus detection area if the object image to be focused is detected by the detection unit, and the object image becomes unable to be detected after the focus detection area is set based on the detection result, and the tilt is determined to be unchanged.

2. The imaging apparatus according to claim 1, wherein the focus adjustment unit uses for the focus adjustment a combined value of the AF evaluation value acquired based on the image signal of the set focus detection area and an AF evaluation value acquired based on an image signal of an area set in advance, if the focus detection area is set by the setting unit based on a detection result of the detection unit, and acquires an AF evaluation value to be used for the focus adjustment based on the image signal of the area set in advance, if the focus detection area is not set by the setting unit based on a detection result of the detection unit.

3. The imaging apparatus according to claim 1, wherein the determination unit includes,
a tilt sensor configured to detect the tilt of the imaging apparatus;
a calculation unit configured to calculate an amount of change of the tilt of the imaging apparatus based on a detection result of the tilt sensor; and
a determination unit configured to determine whether the tilt is changed by comparing the calculated amount of change of the tilt with a threshold value set in advance.

4. The imaging apparatus according to claim 3, further comprising a focal length acquiring unit configured to acquire a focal length of the imaging optical system, and a threshold value setting unit configured to set a threshold value used by the determination unit depending on the focal length acquired by the focal length acquiring unit.

5. The imaging apparatus according to claim 4, wherein the threshold value setting unit sets a smaller threshold value if the focal length is longer.

6. The imaging apparatus according to claim 1, wherein the object image to be focused is a human face.

7. A control method for an imaging apparatus comprising:
detecting an object image to be focused from an image signal obtained by imaging;
setting, if the object image to be focused is detected, an area including the object image as a focus detection area;
acquiring an AF evaluation value by extracting a high frequency component from the image signal of the focus detection area;
adjusting focus using the AF evaluation value;
determining whether a tilt of the imaging apparatus is changed; and
maintaining a setting of the focus detection area if the object image to be focused is detected, and the object image becomes unable to be detected after the focus detection area is set based on the detection result, and if the tilt is determined to be unchanged.

8. An imaging apparatus comprising:
a detection unit configured to detect an object image to be focused from an image signal obtained by imaging;
a setting unit configured to set a focus detection area used for acquiring an AF evaluation value that indicates a focus state of an imaging optical system;
a focus adjustment unit configured to perform focus adjustment by acquiring the AF evaluation value based on the image signal obtained from the focus detection area, and by moving the imaging optical system based on the AF evaluation value; and
a determination unit configured to determine whether a tilting or a panning operation is performed;
wherein the setting unit maintains setting of the focus detection area if the object image to be focused is detected by the detection unit, and the object image becomes unable to be detected after the focus detection area is set based on the detection result, and if no tilting nor the panning operation is determined.

9. The imaging apparatus according to claim 8, wherein the focus adjustment unit uses, for the focus adjustment, a combined value of the AF evaluation value acquired based on the image signal of the set focus detection area and an AF evaluation value acquired based on an image signal of an area set in advance, if the focus detection area is set by the setting unit based on a detection result of the detection unit, and acquires an AF evaluation value to be used for the focus adjustment based on the image signal of the area set in advance, if the focus detection area is not set by the setting unit based on a detection result of the detection unit.

10. The imaging apparatus according to claim 8, wherein the determination unit includes an angular velocity sensor, a shake determination unit configured to determine an amplitude of a shake according to a result obtained from the angular velocity sensor, and a determination unit configured to determine whether the panning operation or the tilting operation is performed based on the determined amplitude of the shake and a period of time while the shake continues.

11. The imaging apparatus according to claim 8, wherein the determination unit compares image signals of consecutive frame images obtained by continuous imaging, determines a shake state, and determines whether the panning operation or the tilting operation is performed based on the determined shake state.

12. The imaging apparatus according to claim 8, wherein the object image to be focused is a human face.

13. A control method for an imaging apparatus, the method comprising:
detecting an object image to be focused based on an image signal obtained by imaging;
setting, if the object image to be focused is detected, an area including the object image as a focus detection area;

acquiring an AF evaluation value by extracting a high frequency component from the image signal of the focus detection area;

adjusting focus using the AF evaluation value;

determining whether a tilting or a panning operation is performed; and maintaining a setting of the focus detection area if the object image to be focused is detected, the object image becomes unable to be detected after the focus detection area is set based on the detection result, and if no panning nor tilting is detected.

* * * * *